United States Patent
Warren et al.

(10) Patent No.: US 12,306,524 B1
(45) Date of Patent: *May 20, 2025

(54) MULTI-DIELECTRIC COAXIAL PUSH-CABLES AND ASSOCIATED APPARATUS

(71) Applicant: SeeScan, Inc., San Diego, CA (US)

(72) Inventors: Alexander L. Warren, Escondido, CA (US); Mark S. Olsson, La Jolla, CA (US)

(73) Assignee: SEESCAN, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,889

(22) Filed: May 3, 2024

Related U.S. Application Data

(63) Continuation of application No. 16/443,789, filed on Jun. 17, 2019, now Pat. No. 11,988,951.

(60) Provisional application No. 62/686,589, filed on Jun. 18, 2018.

(51) Int. Cl.

| | |
|---|---|
| *G03B 37/00* | (2021.01) |
| *G02B 6/44* | (2006.01) |
| *H01B 1/02* | (2006.01) |
| *H01B 11/18* | (2006.01) |
| *H04N 7/18* | (2006.01) |
| *H04N 23/56* | (2023.01) |
| *H04N 23/50* | (2023.01) |

(52) U.S. Cl.
CPC ......... *G03B 37/005* (2013.01); *G02B 6/4416* (2013.01); *G02B 6/443* (2013.01); *H01B 1/026* (2013.01); *H01B 11/1808* (2013.01); *H01B 11/1891* (2013.01); *H04N 7/183* (2013.01); *H04N 23/56* (2023.01); *H04N 23/555* (2023.01)

(58) Field of Classification Search
CPC ......... G03B 37/005; G01N 2021/9546; G01N 21/954; H01B 11/1804
See application file for complete search history.

(56) References Cited

U.S. PATENT DOCUMENTS

| | | | |
|---|---|---|---|
| 5,939,679 A | 8/1999 | Olsson | |
| 2016/0173829 A1* | 6/2016 | Olsson | H04N 7/183 348/84 |
| 2016/0305891 A1* | 10/2016 | Olsson | E03F 7/12 |
| 2017/0134693 A1 | 5/2017 | Chapman et al. | |

OTHER PUBLICATIONS

International Searching Authority, "Written Opinion of the International Searching Authority" for PCT Patent Application No. PCT/US19/37556, Dec. 26, 2019, European Patent Office, Munich.

* cited by examiner

*Primary Examiner* — Kathleen V Nguyen
(74) *Attorney, Agent, or Firm* — Steven C. Tietsworth, Esq; Michael J. Pennington, Esq

(57) ABSTRACT

Coaxial video push-cables are disclosed. One embodiment includes a central conductor and a multi-dielectric stack of multiple concentric tubular layers disposed around the central conductor having one or more structural layers and one or more impedance tuning layers where the thickness of materials of each layer are selected to provide a pre-defined elastic modulus and electromagnetic impedance, an electromagnetic shielding layer, and a jacket enclosing the shielding layer, multi-dielectric stack layers, and central conductor.

16 Claims, 28 Drawing Sheets

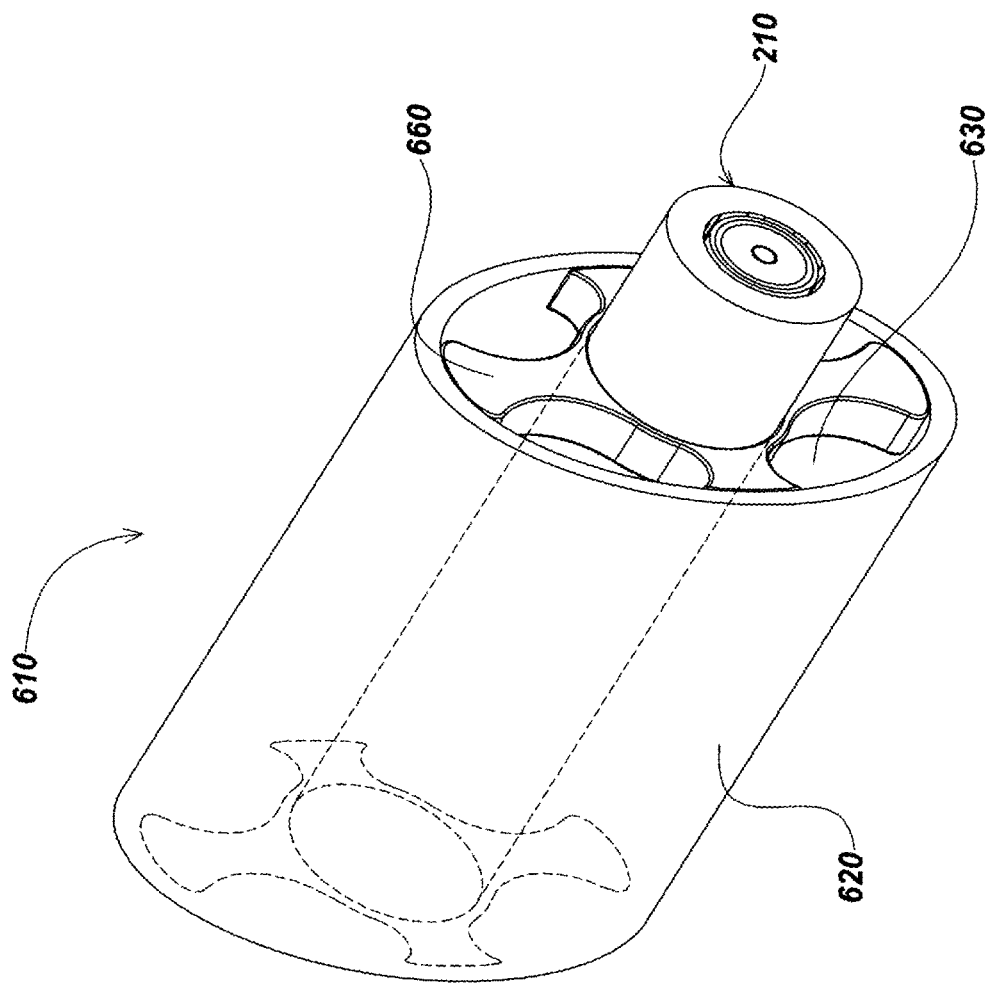

MULTI-DIELECTRIC COAXIAL PUSH-CABLES AND ASSOCIATED APPARATUS

FIELD

This disclosure relates generally to systems for inspecting and clearing obstructions from the interior of pipes, conduits or other voids. More specifically, but not exclusively, this disclosure relates to video push-cables having a coaxial cable structure for providing electrical power and data or other signaling between a camera head and a camera control unit (CCU) or other display device.

BACKGROUND

Devices and methods for inspecting the interior of pipes or other cavities using imaging are well known in the art. For example, existing pipe inspection systems may include a camera head coupled to a video push-cable, with the camera head pushed into the pipe to facilitate displaying, recording and/or mapping of the pipe interior by capturing images or video for display or recording.

Conventional pipe inspection systems generally include a semi-rigid video push-cable that provides a mechanical connection between a rotatable drum reel, used to dispense the video push-cable with an attached camera head to be pushed down a pipe, as well as electrical connections providing power to and/or images or video from the camera head. The camera head may include imaging sensors (imagers), associated electronics, optics, lighting elements (e.g., LEDs) and/or other sensors to generate images or video of the pipe's interior as well as additional information. Images and video taken in the pipe may be transferred via electrical connections in the video push-cable to a camera control unit (CCU) or other device connected to the drum reel at the ground surface. The CCU or other device may display and/or store the images or video, and may also control operation of the camera head.

Existing video push-cables used for pipe inspection systems are often helically wrapped with filler rods and conductors wound around a semi-rigid central push-rod. The central push-rod is typically a high-strength rod of composite material, such as fiberglass, which provides the stiffness necessary to deploy the video push-cable a considerable distance, yet is flexible enough to allow sharp turns in pipes or other voids. These video push-cables, however, may be difficult to deploy or retract due to physical size of the push-cable, and/or may cause problems with signaling and power provision when used with newer camera heads and/or may prove unable to pass high speed, high bandwidth signals due to electrical properties such as loss, impedance discontinuities, and other undesirable characteristics of an electrical transmission line. Still other issues include DC resistance, and moisture absorption.

Coaxial cables known in the art teach towards utilizing materials with low dielectric constants as an insulator positioned between the inner and outer conductors. Such low dielectric constant materials may be used to achieve target impedance with a minimal cross-sectional diameter. Commonly used dielectric materials may further be chosen so as to reduce power loss due to its loss tangent as well as provide a suitable modulus of elasticity to allow the cable to bend and flex easily. As such, coaxial cables known in the art lack the elastic modulus, stiffness, and strength required of a push-cable. In like manner, a coaxial cable optimized to meet the needs of a push-cable would be unable to match the performance metrics of common coaxial cable constructions using common dielectric materials, due to the unfavorable loss tangent and dielectric constant of, for example, fiberglass.

Video push-cables having a coaxial configuration known in the art may generally include a central conductor with a tubular dielectric material, generally of fiberglass, disposed about the conductor. Such video push-cables may further include shielding material and a jacket disposed about the dielectric material layer and central conductor. In order to achieve targeted electromagnetic impedance and elastic modulus in such a coaxial video push-cable of sufficiently small diameter to fit in common pipe sizes and/or other confined spaces, the central conductor diameter is severely limited. In combination with fiberglass, such coaxial video push-cable embodiments result in significant signal loss.

Furthermore, there is very little in the art regarding push-cables having both the functionality of a video push-cable and a jetter push-cable. The few known push-cables for both video communication and jetting away of obstructions in a pipe fail to optimize for loss tangent, electromagnetic impedance, and/or elastic modulus, especially simultaneously.

Accordingly, there is a need in the art to address the above-described as well as other problems to provide enhanced performance video push-cables.

SUMMARY

In accordance with various aspects of this disclosure, one multi-dielectric video push-cable embodiment may include a central conductor with a multi-dielectric stack of multiple concentric tubular layers disposed around the central conductor. The multiple concentric tubular layers of the multi-dielectric stack may have one or more structural layers and impedance tuning layers wherein the selected thickness and materials of these layers may be selected to achieve targeted elastic modulus and electromagnetic impedance for the overall coaxial video push-cable. The multi-dielectric video push-cable may further include an electromagnetic shielding layer disposed about the multi-dielectric stack as well as a jacket disposed about the electromagnetic shielding layer.

In another aspect, the present disclosure includes another multi-dielectric video push-cable embodiment that may include a central structural element of a rigid dielectric material selected to achieve targeted elastic modulus for the multi-dielectric video push-cable. A conductor layer may be disposed about the central structural element. The multi-dielectric video push-cable embodiment may further include an impedance tuning layer disposed about the conductor layer having a thickness of material selected to achieve target electromagnetic impedance for the overall multi-dielectric video push-cable. The multi-dielectric video push-cable embodiment may further include an electromagnetic shielding layer disposed about the multi-dielectric stack as well as a jacket disposed about the electromagnetic shielding layer.

In another aspect, the present disclosure may include a jetter video push-cable embodiment that may include a central hose element with a conductor layer disposed about the central hose element. The jetter video push-cable embodiment may further include an impedance tuning layer disposed about the conductor layer of a dielectric material having a thickness selected to achieve target electromagnetic impedance for the overall multi-dielectric video push-cable. The jetter video push-cable embodiment may further include an electromagnetic shielding layer disposed about the multi-dielectric stack as well as a jacket disposed about the electromagnetic shielding layer.

In another aspect, the present disclosure may include a jetter video push-cable embodiment. The jetter video push-cable embodiment may include a video push-cable disposed inside a hose wherein a cavity formed between the video push-cable and hose exists for the conveyance of water.

In another aspect, the present disclosure may include another jetter video push-cable embodiment. The jetter video push-cable embodiment may include a hose formed with a compartment feature for retaining push-cable elements disposed therein. The hose may further include a cavity for the conveyance of water.

In another aspect, the present disclosure may include a jetter camera head. The jetter camera head may include a coupling element to secure the jetter camera head to a jetter video push-cable diverting water and conductive elements carrying power and signal to related elements inside the jetter camera head. The jetter camera head may have passages for conveying water to a nozzle element having one or more nozzles for directing and controlling the jet of water. The jetter camera head may further include a camera element having one or more cameras and an illumination element to illuminate the field of view captured by the one or more cameras.

In another aspect, the present disclosure may include a jetter attachment apparatus. The jetter attachment apparatus may include a first coupling element for securing the jetter attachment apparatus to a jetter video push-cable and divert water and conductive elements carrying power and signal to related elements inside the jetter attachment apparatus. The jetter attachment apparatus may further include a nozzle element having one or more nozzles for directing and controlling the jet of water from the jetter attachment apparatus. The jetter attachment apparatus may have one or more passages for conveying water from a jetter video push-cable to the nozzle elements and a conductive element for provisioning of signal and power to a second coupling and further to a camera head. The jetter attachment apparatus may include a second coupling element for securing a camera head to the jetter attachment apparatus.

In another aspect, the present disclosure includes a drum reel having a storage element for storing a jetter video push-cable. The drum reel may include a water input element for connecting the drum reel to a water source, a signal connecting element to connect the drum reel to a CCU, and a combining element for distributing and connecting water and signal carrying element to the jetter video push-cable.

Various additional aspects, features, functions, and details are further described below in conjunction with the appended Drawings.

BRIEF DESCRIPTION OF THE DRAWINGS

The present application may be more fully appreciated in connection with the following detailed description taken in conjunction with the accompanying drawings, wherein:

FIG. 6E is the jetter video push-cable from FIG. 6A including another positioning element.

DETAILED DESCRIPTION OF EMBODIMENTS

Overview

Figure 1:
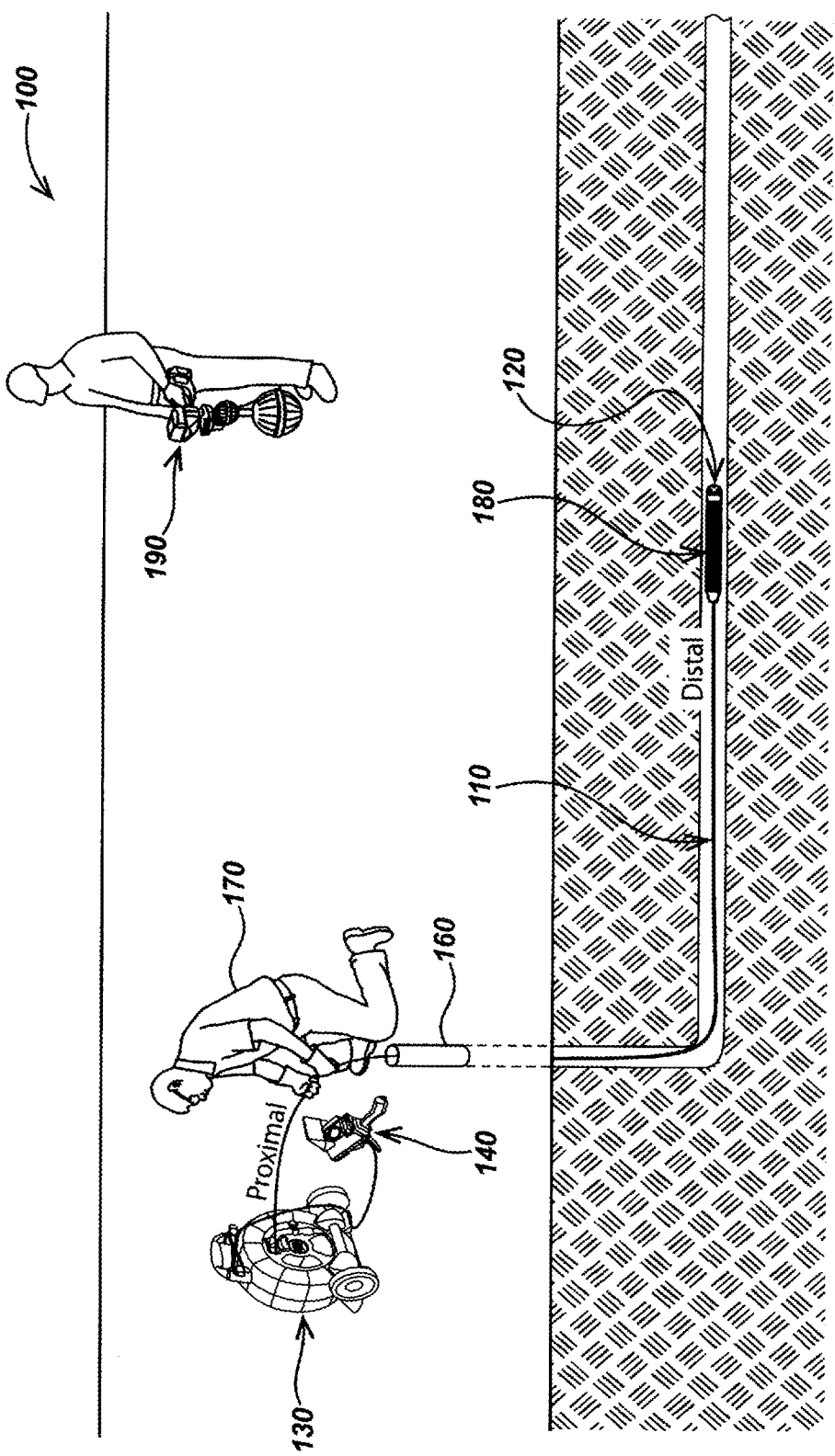
FIG. 1 illustrates details of an embodiment of a pipe inspection system configured with a multi-dielectric coaxial push-cable in accordance with certain aspects.

Various details of video push-cables and associated video pipe inspection systems as well as utility locators and associated systems and devices that may be used in additional device or system embodiments in combination with the disclosures herein are described in co-assigned patents and patent applications including: U.S. Pat. No. 6,545,704, issued Apr. 7, 1999, entitled VIDEO PIPE INSPECTION DISTANCE MEASURING SYSTEM; U.S. Pat. No. 5,939,679, issued Aug. 17, 1999, entitled VIDEO PUSH CABLE; U.S. Pat. No. 6,831,679, issued Dec. 14, 2004, entitled VIDEO CAMERA HEAD WITH THERMAL FEEDBACK LIGHTING CONTROL; U.S. Pat. No. 6,862,945, issued Mar. 8, 2005, entitled CAMERA GUIDE FOR VIDEO PIPE INSPECTION SYSTEM; U.S. Pat. No. 6,908,310, issued Jun. 21, 2005, entitled SLIP RING ASSEMBLY WITH INTEGRAL POSITION ENCODER; U.S. Pat. No. 6,958,767, issued Oct. 25, 2005, entitled VIDEO PIPE INSPECTION SYSTEM EMPLOYING NON-ROTATING CABLE STORAGE DRUM; U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled A COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,298,126, issued Nov. 20, 2007, entitled SONDES FOR LOCATING UNDERGROUND PIPES AND CONDUITS; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,443,154, issued Oct. 28, 2008, entitled MULTI-SENSOR MAPPING OMNIDIRECTIONAL SONDE AND LINE LOCATOR; U.S. Pat. No. 7,498,797, issued Mar. 3, 2009, entitled LOCATOR WITH CURRENT-MEASURING CAPABILITY; U.S. Pat. No. 7,498,816, issued Mar. 3, 2009, entitled OMNIDIRECTIONAL SONDE AND LINE LOCATOR; U.S. Pat. No. 7,518,374, issued Apr. 14, 2009, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 7,557,559, issued Jul. 7, 2009, entitled COMPACT LINE ILLUMINATOR FOR LOCATING BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. patent application Ser. No. 12/704,808, filed Feb. 12, 2010, entitled PIPE INSPECTION SYSTEM WITH REPLACEABLE CABLE STORAGE DRUM; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 7,825,647, issued Nov. 2, 2010, entitled METHOD FOR LOCATING BURIED PIPES AND CABLES; U.S. Pat. No. 7,830,149, issued Nov. 9, 2010, entitled AN UNDERGROUND UTILITY LOCATOR WITH A TRANSMITTER A PAIR OF UPWARDLY OPENING POCKETS AND HELICAL COIL TYPE ELECTRICAL CORDS; U.S. Pat. No. 7,863,885, issued Jan. 4, 2011, entitled SONDES FOR LOCATING UNDERGROUND PIPES AND CONDUITS; U.S. Pat. No. 7,948,236, issued May 24, 2011, entitled ADAPTIVE MULTICHANNEL LOCATOR SYSTEM FOR MULTIPLE PROXIMITY DETECTION; U.S. Pat. No. 7,969,419, issued Jun. 28, 2011, entitled PRE-AMPLIFIER AND MIXER CIRCUITRY FOR A LOCATOR ANTENNA; U.S. patent application Ser. No. 13/189,844, filed Jul. 25, 2011, entitled BURIED OBJECT LOCATOR SYSTEMS AND METHODS; U.S. Pat. No. 7,990,151, issued Aug. 2, 2011, entitled TRI-POD BURIED LOCATOR SYSTEM; U.S. Pat. No. 8,013,610, issued Sep. 6, 2011, entitled HIGH Q SELF-TUNING LOCATING TRANSMITTER; U.S. Pat. No. 8,035,390, issued Oct. 11, 2011, entitled OMNIDIRECTIONAL SONDE AND LINE LOCATOR; U.S. patent application Ser. No. 13/346,668, Jan. 9, 2012, entitled PORTABLE CAMERA CONTROLLER PLATFORM FOR USE WITH PIPE INSPECTION SYSTEM; U.S. Pat. No. 8,106,660, issued Jan. 31, 2012, entitled SONDE ARRAY FOR USE WITH BURIED LINE LOCATOR; U.S. Pat. No. 8,203,343, issued Jun. 19, 2012, entitled RECONFIGURABLE PORTABLE LOCATOR EMPLOYING MULTIPLE SENSOR ARRAYS HAVING FLEXIBLE NESTED ORTHOGONAL ANTENNAS; U.S. patent application Ser. No. 13/584,799, filed Aug. 13, 2012, entitled BURIED OBJECT LOCATOR SYSTEMS AND METHODS; U.S. Pat. No. 8,248,056, issued Aug. 21, 2012, entitled A BURIED OBJECT LOCATOR SYSTEM EMPLOYING AUTOMATED VIRTUAL DEPTH EVENT DETECTION AND SIGNALING; U.S. Pat. No. 8,264,226, issued Sep. 11, 2012, entitled SYSTEMS AND METHODS FOR LOCATING BURIED PIPES AND CABLES WITH A MAN PORTABLE LOCATOR AND A TRANSMITTER IN A MESH NETWORK; U.S. patent application Ser. No. 13/647,310, filed Oct. 8, 2012, entitled PIPE INSPECTION SYSTEM APPARATUS AND METHODS; U.S. Pat. No. 8,289,385, issued Oct. 16, 2012, entitled PUSH-CABLE FOR PIPE INSPECTION SYSTEM; U.S. patent application Ser. No. 13/769,202, Feb. 15, 2013, entitled SMART PAINT STICK DEVICES AND METHODS; U.S. patent application Ser. No. 13/774,351, Feb. 22, 2013, entitled DOCKABLE TRIPODAL CAMERA CONTROL UNIT; U.S. patent application Ser. No. 13/787,711, Mar. 6, 2013, entitled DUAL SENSED LOCATING SYSTEMS AND METHODS; U.S. patent application Ser. No. 13/793,168, filed Mar. 11, 2013, entitled BURIED OBJECT LOCATORS WITH CONDUCTIVE ANTENNA BOBBINS; U.S. Pat. No. 8,395,661, issued Mar. 12, 2013, entitled PIPE INSPECTION SYSTEM WITH SELECTIVE IMAGE CAPTURE; U.S. patent application Ser. No. 13/826,112, Mar. 14, 2013, entitled SYSTEMS AND METHODS INVOLVING A SMART CABLE STORAGE DRUM AND NETWORK NODE FOR TRANSMISSION OF DATA; U.S. Pat. No. 8,400,154, issued Mar. 19, 2013, entitled LOCATOR ANTENNA WITH CONDUCTIVE BOBBIN; U.S. patent application Ser. No. 13/851,951, Mar. 27, 2013, entitled DUAL ANTENNA SYSTEMS WITH VARIABLE POLARIZATION; U.S. patent application Ser. No. 13/894,038, May 14, 2013, entitled OMNI-INDUCER TRANSMITTING DEVICES AND METHODS; U.S. patent application Ser. No. 13/925,636, Jun. 24, 2013, entitled MODULAR BATTERY PACK APPARATUS, SYSTEMS, AND METHODS INCLUDING VIRAL DATA AND/OR CODE TRANSFER; U.S. patent application Ser. No. 14/027,027, Sep. 13, 2013, entitled SONDE DEVICES INCLUDING A SECTIONAL FERRITE CORE STRUCTURE; U.S. Pat. No. 8,547,428, issued Oct. 1, 2013, entitled PIPE MAPPING SYSTEM; U.S. Pat. No. 8,564,295, issued Oct. 22, 2013, entitled METHOD FOR SIMULTANEOUSLY DETERMINING A PLURALITY OF DIFFERENT LOCATIONS OF THE BURIED OBJECTS AND SIMULTANEOUSLY INDICATING THE DIFFERENT LOCA- TIONS TO A USER; U.S. patent application Ser. No. 14/033,349, filed Sep. 20, 2013, entitled PIPE INSPECTION WITH SNAP ON PIPE GUIDES; U.S. Pat. No. 8,540,429, issued Sep. 24, 2013, entitled SNAP ON PIPE GUIDE; U.S. patent application Ser. No. 14/077,022, filed Nov. 11, 2013, entitled WEARABLE MAGNETIC FIELD UTILITY LOCATOR SYSTEM WITH SOUND FIELD GENERATION; U.S. Pat. No. 8,587,648, issued Nov. 19, 2013, entitled SELF-LEVELING CAMERA HEAD; U.S. patent application Ser. No. 14/136,104, Dec. 20, 2013, entitled ROTATING CONTACT ASSEMBLIES FOR SELF-LEVELING CAMERA HEADS; U.S. patent application Ser. No. 14/148,649, Jan. 6, 2014, entitled MAPPING LOCATING SYSTEMS AND METHODS; U.S. Pat. No. 8,635,043, issued Jan. 21, 2014, entitled LOCATOR AND TRANSMITTER CALIBRATION SYSTEM; U.S. patent application Ser. No. 14/203,485, filed Mar. 10, 2014, entitled PIPE INSPECTION CABLE COUNTER AND OVERLAY MANAGEMENT SYSTEM; U.S. patent application Ser. No. 14/207,527, Mar. 12, 2014, entitled ROTATING CONTACT ASSEMBLIES FOR SELF-LEVELING CAMERA HEADS; U.S. patent application Ser. No. 14/207,502, Mar. 12, 2014, entitled GRADIENT ANTENNA COILS FOR USE IN LOCATING SYSTEMS; U.S. patent application Ser. No. 14/214,151, Mar. 14, 2014, entitled DUAL ANTENNA SYSTEMS WITH VARIABLE POLARIZATION; U.S. patent application Ser. No. 14/216,358, Mar. 17, 2014, entitled SMART CABLE STORAGE DRUM AND NETWORK NODE SYSTEM AND METHODS; U.S. Pat. No. 8,717,028, issued May 6, 2014, entitled SPRING CLIPS FOR USE WITH LOCATING TRANSMITTERS; U.S. Pat. No. 8,773,133, issued Jul. 8, 2014, entitled ADAPTIVE MULTICHANNEL LOCATOR SYSTEM FOR MULTIPLE PROXIMITY DETECTION; U.S. Pat. No. 9,703,002, issued Jul. 13, 2014, entitled UTILITY LOCATOR SYSTEMS AND METHODS; U.S. patent application Ser. No. 14/446,145, Jul. 29, 2014, entitled UTILITY LOCATING SYSTEMS WITH MOBILE BASE STATION; U.S. Pat. No. 8,841,912, issued Sep. 23, 2014, entitled PRE-AMPLIFIER AND MIXER CIRCUITRY FOR A LOCATOR ANTENNA; U.S. patent application Ser. No. 14/935,878, Nov. 7, 2014, entitled INSPECTION CAMERA DEVICES AND METHODS WITH SELECTIVELY ILLUMINATED MULTISENSOR IMAGING; U.S. patent application Ser. No. 14/557,163, Dec. 1, 2014, entitled ASSYMETRIC DRAG FORCE BEARING; U.S. Pat. No. 8,908,027, issued Dec. 9, 2014, entitled ASYMMETRIC DRAG FORCE BEARING FOR USE WITH PUSH-CABLE STORAGE DRUM; U.S. Pat. No. 8,970,211, issued Mar. 3, 2015, entitled PIPE INSPECTION CABLE COUNTER NAD OVERLAY MANAGEMENT SYSTEM; U.S. patent application Ser. No. 14/642,596, filed Mar. 9, 2015, entitled PIPE CLEARING CABLES AND APPARATUS; U.S. Pat. No. 8,984,698, issued Mar. 24, 2015, entitled LIGHT WEIGHT SEWER CABLE; U.S. patent application Ser. No. 14/709,301, filed May 11, 2015, entitled PIPE MAPPING SYSTEMS AND METHODS; U.S. Pat. No. 9,041,794, issued May 26, 2015, entitled PIPE MAPPING SYSTEMS AND METHODS; U.S. Pat. No. 9,057,754, issued Jun. 16, 2015, entitled ECONOMICAL MAGNETIC LOCATOR APPARATUS AND METHOD; U.S. patent application Ser. No. 14/746,590, Jun. 22, 2015, entitled THERMAL EXTRACTION ARCHITECTURES FOR CAMERA AND LIGHTING DEVICES; U.S. Pat. No. 9,066,446, issued Jun. 23, 2015, entitled THERMAL EXTRACTION ARCHITECTURE FOR CAMERA HEADS, INSPECTION SYSTEMS, AND OTHER DEVICES AND SYSTEMS; U.S. patent application Ser. No. 14/749,545, Jun. 24, 2015, entitled ADJUSTABLE VARIABLE RESOLUTION INSPECTION SYSTEMS AND METHODS; U.S. patent application Ser. No. 14/797,760, Jul. 13, 2015, entitled HAPTIC DIRECTIONAL FEEDBACK HANDLES FOR LOCATING DEVICES; U.S. patent application Ser. No. 14/798,177, filed Jul. 13, 2015, entitled MARKING PAINT APPLICATOR FOR USE WITH PORTABLE UTILITY LOCATOR; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. Pat. No. 9,080,992, issued Jul. 14, 2015, entitled ADJUSTABLE VARIABLE RESOLUTION INSPECTION SYSTEMS AND METHODS; U.S. patent application Ser. No. 14/800,490, Jul. 15, 2013, entitled UTILITY LOCATOR DEVICES, SYSTEMS, AND METHODS WITH SATELLITE AND MAGNETIC FIELD SONDE ANTENNA SYSTEMS; U.S. Pat. No. 9,085,007, issued Jul. 21, 2015, entitled MARKING PAINT APPLICATOR FOR PORTABLE LOCATOR; U.S. Pat. No. 9,134,255, issued Sep. 15, 2015, entitled PIPE INSPECTION SYSTEM WITH SELECTIVE IMAGE CAPTURE; U.S. patent application Ser. No. 14/949,868, Nov. 23, 2015, entitled BURIED OBJECT LOCATORS WITH DODECAHEDRAL ANTENNA NODES; U.S. Pat. No. 9,207,350, issued Dec. 8, 2015, entitled BURIED OBJECT LOCATOR APPARATUS WITH SAFETY LIGHTING ARRAY; U.S. patent application Ser. No. 14/970,362, Dec. 15, 2015, entitled COAXIAL VIDEO PUSH-CABLES FOR USE IN INSPECTION SYSTEMS; U.S. Pat. No. 9,222,809, issued Dec. 29, 2015, entitled PORTABLE PIPE INSPECTION SYSTEMS AND APPARATUS; U.S. patent application Ser. No. 15/006,119, Jan. 26, 2016, entitled SELF-STANDING MULTI-LEG ATTACHMENT DEVICES FOR USE WITH UTILITY LOCATORS; U.S. patent application Ser. No. 15/434,056, Feb. 16, 2016, entitled BURIED UTILITY MARKER DEVICES, SYSTEMS, AND METHODS; U.S. patent application Ser. No. 15/050,267, filed Feb. 22, 2016, entitled SELF-LEVELING CAMERA HEAD; U.S. Pat. No. 9,277,105, issued Mar. 1, 2016, entitled SELF-LEVELING CAMERA HEAD; U.S. Pat. No. 9,341,740, issued May 17, 2016, entitled OPTICAL GROUND TRACKING APPARATUS, SYSTEMS, AND METHODS; U.S. patent application Ser. No. 15/187,785, Jun. 21, 2016, entitled BURIED UTILITY LOCATOR GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/225,623, Aug. 1, 2016, entitled SONDE-BASED GROUND-TRACKING APPARATUS AND METHODS; U.S. patent application Ser. No. 15/225,721, filed Aug. 1, 2016, entitled SONDES AND METHODS FOR USE WITH BURIED LINE LOCATOR SYSTEMS; U.S. Pat. No. 9,411,066, issued Aug. 9, 2016, entitled SONDES AND METHODS FOR USE WITH BURIED LINE LOCATOR SYSTEMS; U.S. Pat. No. 9,411,067, issued Aug. 9, 2016, entitled GROUND-TRACKING SYSTEMS AND APPARATUS; U.S. patent application Ser. No. 15/247,503, Aug. 25, 2016, entitled LOCATING DEVICES, SYSTEMS, AND METHODS USING FREQUENCY SUITES FOR UTILITY DETECTION; U.S. Pat. No. 9,927,546, issued Aug. 29, 2016, entitled PHASE SYNCHRONIZED BURIED OBJECT LOCATOR APPARATUS, SYSTEMS, AND METHODS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. patent application Ser. No. 15/264,355, Sep. 13, 2016, entitled HIGH BANDWIDTH VIDEO PUSH-CABLES FOR PIPE INSPECTION SYSTEMS; U.S. Pat. No. 9,448,376, issued Sep. 20, 2016, entitled HIGH BANDWIDTH PUSH-CABLES FOR VIDEO PIPE INSPECTION SYSTEMS; U.S. Pat. No. 9,465,129, issued Oct. 11, 2016, entitled IMAGE-BASED MAPPING LOCATING SYSTEM; U.S. Pat. No. 9,468,954, issued Oct. 18, 2016, entitled PIPE INSPECTION SYSTEM WITH JETTER PUSH-CABLE; U.S. patent application Ser. No. 15/331,570, Oct. 21, 2016, entitled KEYED CURRENT SIGNAL UTILITY LOCATING SYSTEMS AND METHODS; U.S. Pat. No. 9,477,147, issued Oct. 25, 2016, entitled SPRING ASSEMBLIES WITH VARIABLE FLEXIBILITY FOR USE WITH PUSH-CABLES AND PIPE INSPECTION SYSTEMS; U.S. patent application Ser. No. 15/339,766, Oct. 31, 2016, entitled GRADIENT ANTENNA COILS AND ARRAYS FOR USE IN LOCATING SYSTEMS; U.S. patent application Ser. No. 15/345,421, Nov. 7, 2016, entitled OMNI-INDUCER TRANSMITTING DEVICES AND METHODS; U.S. Pat. No. 9,488,747, issued Nov. 8, 2016, entitled GRADIENT ANTENNA COILS AND ARRAYS FOR USE IN LOCATING SYSTEM; U.S. Pat. No. 9,494,706, issued Nov. 15, 2016, entitled OMNI-INDUCER TRANSMITTING DEVICES AND METHODS; U.S. patent application Ser. No. 15/360,979, Nov. 23, 2016, entitled UTILITY LOCATING SYSTEMS, DEVICES, AND METHODS USING RADIO BROADCAST SIGNALS; U.S. patent application Ser. No. 15/369,693, Dec. 5, 2016, entitled CABLE STORAGE DRUM WITH MOVABLE CCU DOCKING APPARATUS; U.S. patent application Ser. No. 15/376,576, filed Dec. 12, 2016, entitled MAGNETIC SENSING BURIED OBJECT LOCATOR INCLUDING A CAMERA; U.S. Pat. No. 9,521,303, issued Dec. 13, 2016, entitled CABLE STORAGE DRUM WITH MOVEABLE CCU DOCKING APPARATUS; U.S. Pat. No. 9,523,788, issued Dec. 20, 2016, entitled MAGNETIC SENSING BURIED OBJECT LOCATOR INCLUDING A CAMERA; U.S. patent application Ser. No. 15/396,068, filed Dec. 30, 2016, entitled UTILITY LOCATOR TRANSMITTER APPARATUS AND METHODS; U.S. patent application Ser. No. 15/425,785, filed Feb. 6, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. Pat. No. 9,571,326, issued Feb. 14, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. patent application Ser. No. 15/457,149, Mar. 13, 2017, entitled USER INTERFACES FOR UTILITY LOCATORS; U.S. patent application Ser. No. 15/457,222, Mar. 13, 2017, entitled SYSTEMS AND METHODS FOR LOCATING BURIED OR HIDDEN OBJECTS USING SHEET CURRENT FLOW MODELS; U.S. patent application Ser. No. 15/457,897, Mar. 13, 2017, entitled UTILITY LOCATORS WITH RETRACTABLE SUPPORT STRUCTURES AND APPLICATIONS THEREOF; U.S. patent application Ser. No. 14/022,067, Mar. 21, 2017, entitled USER INTERFACES FOR UTILITY LOCATORS; U.S. Pat. No. 9,599,449, issued Mar. 21, 2017, entitled SYSTEMS AND METHODS FOR LOCATING BURIED OR HIDDEN OBJECTS USING SHEET CURRENT FLOW MODELS; U.S. patent application Ser. No. 15/470,642, Mar. 27, 2017, entitled UTILITY LOCATING APPARATUS AND SYSTEMS USING MULTIPLE ANTENNA COILS; U.S. patent application Ser. No. 15/470,713, Mar. 27, 2017, entitled UTILITY LOCATORS WITH PERSONAL COMMUNICATION DEVICE USER INTERFACES; U.S. patent application Ser. No. 15/483,924, Apr. 10, 2017, entitled SYSTEMS AND METHODS FOR DATA TRANSFER USING SELF-SYNCHRONIZING QUADRATURE AMPLITUDE MODULATION (QAM); U.S. patent application Ser. No. 15/485,082, Apr. 11, 2017, entitled MAGNETIC UTILITY LOCATOR DEVICES AND METHODS; U.S. patent application Ser. No. 15/485,125, Apr. 11, 2017, entitled INDUCTIVE CLAMP DEVICES, SYSTEMS, AND METHODS; U.S. Pat. No. 9,625,602, issued Apr. 18, 2017, entitled SMART PERSONAL COMMUNICATION DEVICES AS USER INTERFACES; U.S. patent application Ser. No. 15/497,040, Apr. 25, 2017, entitled SYSTEMS AND METHODS FOR LOCATING AND/OR MAPPING BURIED UTILITIES USING VEHICLE-MOUNTED LOCATING DEVICES; U.S. Pat. No. 9,632,199, issued Apr. 25, 2017, entitled INDUCTIVE CLAMP DEVICES, SYSTEMS, AND METHODS; U.S. Pat. No. 9,632,202, issued Apr. 25, 2017, entitled ECONOMICAL MAGNETIC LOCATOR APPARATUS AND METHOD; U.S. Pat. No. 9,634,878, issued Apr. 25, 2017, entitled SYSTEMS AND METHODS FOR DATA SYNCHRONIZING QUADRATURE AMPLITUDE MODULATION (QAM); U.S. Pat. No. 9,638,824, issued May 2, 2017, entitled QUAD-GRADIENT COILS FOR USE IN LOCATING SYSTEMS; U.S. patent application Ser. No. 15/590,964, May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS; U.S. patent application Ser. No. 15/623,174, Jun. 14, 2017, entitled TRACKABLE DIPOLE DEVICES, METHODS, AND SYSTEMS FOR USE WITH MARKING PAINT STICKS; U.S. patent application Ser. No. 15/185,018, Jun. 17, 2016, entitled RESILIENTLY DEFORMABLE MAGNETIC FIELD TRANSMITTER CORES FOR USE WITH UTILITY LOCATING DEVICES AND SYSTEMS; U.S. patent application Ser. No. 15/626,399, Jun. 19, 2017, entitled SYSTEMS AND METHODS FOR UNIQUELY IDENTIFYING BURIED UTILITIES IN A MULTI-UTILITY ENVIRONMENT; U.S. Pat. No. 9,684,090, issued Jun. 20, 2017, entitled NULLED-SIGNAL LOCATING DEVICES, SYSTEMS, AND METHODS; U.S. Pat. No. 9,696,447, issued Jul. 4, 2017, entitled BURIED OBJECT METHODS AND APPARATUS USING MULTIPLE ELECTROMAGNETIC SIGNALS; U.S. Pat. No. 9,696,448, issued Jul. 4, 2017, entitled GROUND-TRACKING DEVICES FOR USE WITH A MAPPING LOCATOR; U.S. patent application Ser. No. 15/670,845, Aug. 7, 2017, entitled HIGH FREQUENCY AC-POWERED DRAIN CLEANING AND INSPECTION APPARATUS AND METHODS; U.S. patent application Ser. No. 15/681,250, Aug. 18, 2017, entitled ELECTRONIC MARKER DEVICES AND SYSTEMS; U.S. patent application Ser. No. 15/681,409, filed Aug. 20, 2017, entitled WIRELESS BURIED PIPE AND CABLE LOCATING SYSTEMS; U.S. Pat. No. 9,746,572, issued Aug. 29, 2017, entitled ELECTRONIC MARKER DEVICES AND SYSTEMS; U.S. Pat. No. 9,746,573, issued Aug. 29, 2017, entitled WIRELESS BURIED PIPE AND CABLE LOCATING SYSTEMS; U.S. patent application Ser. No. 15/701,247, Sep. 11, 2017, entitled PIPE INSPECTION SYSTEMS WITH SELF-GROUNDING PORTABLE CAMERA CONTROLLER; U.S. Pat. No. 9,769,366, issued Sep. 19, 2017, entitled SELF-GROUNDING TRANSMITTING POR- TABLE CAMERA CONTROLLER FOR USE WITH PIPE INSPECTION SYSTEMS; U.S. patent application Ser. No. 15/728,250, Oct. 9, 2017, entitled OPTICAL GROUND TRACKING APPARATUS, SYSTEMS, AND METHODS FOR USE WITH BURIED UTILITY LOCATORS; U.S. patent application Ser. No. 15/728,410, Oct. 9, 2017, entitled PIPE INSPECTION SYSTEM WITH JETTER PUSH-CABLE; U.S. Pat. No. 9,784,837, issued Oct. 10, 2017, entitled OPTICAL GROUND TRACKING APPARATUS, SYSTEMS, AND METHODS; U.S. patent application Ser. No. 15/785,330, Oct. 16, 2017, entitled SYSTEMS AND METHODS OF USING A SONDE DEVICE WITH A SECTIONAL FERRITE CORE STRUCTURE; U.S. Pat. No. 9,791,382, issued Oct. 17, 2017, entitled PIPE INSPECTION SYSTEM WITH JETTER PUSH-CABLE; U.S. Pat. No. 9,798,033, issued Oct. 24, 2017, entitled SONDE DEVICES INCLUDING A SECTIONAL FERRITE CORE; U.S. patent application Ser. No. 15/805,007, filed Nov. 6, 2017, entitled PIPE INSPECTION SYSTEM CAMERA HEADS; U.S. patent application Ser. No. 15/806,219, Nov. 7, 2017, entitled MULTI-CAMERA PIPE INSPECTION APPARATUS, SYSTEMS AND METHODS; U.S. patent application Ser. No. 15/811,264, Nov. 13, 2017, entitled SPRING ASSEMBLIES WITH VARIABLE FLEXIBILITY FOR USE WITH PUSH-CABLES AND PIPE INSPECTION SYSTEMS; U.S. patent application Ser. No. 15/811,361, Nov. 13, 2017, entitled OPTICAL GROUND TRACKING APPARATUS, SYSTEMS, AND METHODS; U.S. Pat. No. 9,824,433, issued Nov. 21, 2017, entitled PIPE INSPECTION SYSTEM CAMERA HEADS; U.S. Pat. No. 9,829,783, issued Nov. 28, 2017, entitled SPRING ASSEMBLIES WITH VARIABLE FLEXIBILITY FOR USE WITH PUSH-CABLES AND PIPE INSPECTION SYSTEMS; U.S. Pat. No. 9,835,564, issued Dec. 5, 2017, entitled MULTI-CAMERA PIPE INSPECTION APPARATUS, SYSTEMS, AND METHODS; U.S. Pat. No. 9,841,503, issued Dec. 12, 2017, entitled OPTICAL GROUND TRACKING APPARATUS, SYSTEMS, AND METHODS; U.S. patent application Ser. No. 15/846,102, Dec. 18, 2017, entitled SYSTEMS AND METHODS FOR ELECTRONICALLY MARKING, LOCATING, AND VIRTUALLY DISPLAYING BURIED UTILITIES; U.S. patent application Ser. No. 15/866,360, Jan. 9, 2018, entitled TRACKED DISTANCE MEASURING DEVICE, SYSTEMS, AND METHODS; U.S. patent application Ser. No. 15/870,787, Jan. 12, 2018, entitled MAGNETIC FIELD CANCELING AUDIO SPEAKERS FOR USE WITH BURIED UTILITY LOCATORS OR OTHER DEVICES; U.S. Provisional Patent Application 62/620,959, Jan. 23, 2018, entitled RECHARGEABLE BATTERY PACK ONBOARD CHARGE STATE INDICATION METHODS AND APPARATUS; U.S. Pat. No. 9,880,309, issued Jan. 30, 2018, entitled UTILITY LOCATOR TRANSMITTER APPARATUS AND METHODS; U.S. patent application Ser. No. 15/889,067, Feb. 5, 2018, entitled UTILITY LOCATOR TRANSMITTER DEVICES, SYSTEMS, AND METHODS WITH DOCKABLE APPARATUS; U.S. Pat. No. 9,891,337, issued Feb. 13, 2018, entitled UTILITY LOCATOR TRANSMITTER DEVICES, SYSTEMS, AND METHODS WITH DOCKABLE APPARATUS; U.S. patent application Ser. No. 15/919,077, Mar. 12, 2018, entitled PORTABLE PIPE INSPECTION SYSTEMS AND METHODS; U.S. Pat. No. 9,914,157, issued Mar. 13, 2018, entitled METHODS AND APPARATUS FOR CLEARING OBSTRUCTIONS WITH A JETTER PUSH-CABLE APPARATUS; U.S. patent application Ser. No. 15/922,703, Mar. 15, 2018, entitled SELF-LEVELING INSPECTION SYSTEMS AND METHODS; U.S. patent application Ser. No. 15/925,643, Mar. 19, 2018, entitled PHASE-SYNCHRONIZED BURIED OBJECT TRANSMITTER AND LOCATOR METHODS AND APPARATUS; U.S. patent application Ser. No. 15/925,671, Mar. 19, 2018, entitled MULTI-FREQUENCY LOCATING SYSTEMS AND METHODS; U.S. Pat. No. 9,924,139, issued Mar. 20, 2018, entitled PORTABLE PIPE INSPECTION SYSTEMS AND APPARATUS; U.S. patent application Ser. No. 15/936,250, Mar. 26, 2018, entitled GROUND TRACKING APPARATUS, SYSTEMS, AND METHODS; U.S. Pat. No. 9,927,368, issued Mar. 27, 2018, entitled SELF-LEVELING INSPECTION SYSTEMS AND METHODS; U.S. Pat. No. 9,927,545, issued Mar. 27, 2018, entitled MULTI-FREQUENCY LOCATING SYSTEM AND METHODS; U.S. Pat. No. 9,928,613, issued Mar. 27, 2018, entitled GROUND TRACKING APPARATUS, SYSTEMS, AND METHODS; U.S. Provisional Patent Application 62/656,259, Apr. 11, 2018, entitled GEOGRAPHIC MAP UPDATING METHODS AND SYSTEMS; U.S. patent application Ser. No. 15/954,486, filed Apr. 16, 2018, entitled UTILITY LOCATOR APPARATUS, SYSTEMS, AND METHODS; U.S. Pat. No. 9,945,976, issued Apr. 17, 2018, entitled UTILITY LOCATOR APPARATUS, SYSTEMS, AND METHODS; U.S. patent application Ser. No. 15/960,340, Apr. 23, 2018, entitled METHODS AND SYSTEMS FOR GENERATING INTERACTIVE MAPPING DISPLAYS IN CONJUNCTION WITH USER INTERFACE DEVICES; U.S. Pat. No. 9,959,641, issued May 1, 2018, entitled METHODS AND SYSTEMS FOR SEAMLESS TRANSITIONING IN INTERACTIVE MAPPING SYSTEMS; U.S. Provisional Patent Application 62/686,589, filed Jun. 18, 2018, entitled MULTI-DIELECTRIC COAXIAL PUSH-CABLES; U.S. Provisional Patent Application 62/688,259, filed Jun. 21, 2018, entitled ACTIVE MARKER DEVICES FOR UNDERGROUND USE; U.S. Provisional Patent Application 62/726,500, filed Sep. 4, 2018, entitled VIDEO PIPE INSPECTION SYSTEMS, DEVICES, AND METHODS INTEGRATED WITH NON-VIDEO DATA RECORDING AND COMMUNICATION FUNCTIONALITY; U.S. patent application Ser. No. 16/144,878, filed Sep. 27, 2018, entitled MULTIFUNCTION BURIED UTILITY LOCATING CLIPS; U.S. patent application Ser. No. 16/178,494, filed Nov. 1, 2018, entitled THREE-AXIS MEASUREMENT MODULES AND SENSING METHODS; U.S. Provisional Patent Application 62/756,538, filed Nov. 6, 2018, entitled ROBUST AND LOW COST IMPEDANCE CONTROLLED SLIP RINGS; U.S. Provisional Patent Application 62/768,760, filed Nov. 16, 2018, entitled PIPE INSPECTION AND/OR MAPPING CAMERA HEADS, SYSTEMS, AND METHODS; U.S. Provisional Patent Application 62/777,045, filed Dec. 7, 2018, entitled MAP GENERATION BASED ON UTILITY LINE POSITION AND ORIENTATION ESTIMATES; U.S. Provisional Patent Application 62/794,863, filed Jan. 21, 2019, entitled HEAT EXTRACTION ARCHITECTURE FOR COMPACT VIDEO HEADS; U.S. Provisional Patent Application 62/824,937, filed Mar. 27, 2019, entitled LOW COST AND HIGH PERFORMANCE SIGNAL PROCESSING IN A BURIED OBJECT LOCATOR SYSTEM; and U.S. patent application Ser. No. 16/382,136, filed Apr. 11, 2019, entitled GEOGRAPHIC MAP UPDATING METHODS AND SYSTEMS. The content of each of the above-described patents and applications is incorporated by reference herein in its entirety. The above-described patent applications and patents may be referred to herein collectively as the "incorporated applications."

In accordance with various aspects of this disclosure, one multi-dielectric video push-cable embodiment may include a central conductor with a multi-dielectric stack comprising multiple concentric tubular layers disposed around the central conductor. The central conductor may be between one eighth and five eighth of the diameter of the surrounding structural dielectric layer of the multi-dielectric stack. The central conductor may be copper or a copper alloy, silver or silver alloy, copper-clad steel, or other electrically conductive material or alloy for transmitting electrical power as well as communicating data signals. The multiple concentric tubular layers of the multi-dielectric stack may have one or more structural layers and impedance tuning layers wherein the selected thickness and materials of these layers may be selected to achieve targeted elastic modulus and electromagnetic impedance for the overall coaxial video push-cable. The structural dielectric layer(s) comprising dielectric material having a favorably high elastic modulus for pushing a push-cable through and navigating pipes or other voids. In some such embodiments, the structural dielectric layer(s) may be fiberglass. The impedance tuning layer(s) comprising material with favorably low dielectric constant, less than 4, and loss properties such as loss tangent such that the multi-dielectric stack may achieve target impedance for the multi-dielectric video push-cable. In some such embodiments, the impedance tuning layer(s) may be polypropylene. The multi-dielectric video push-cable may further include an electromagnetic shielding layer disposed about the multi-dielectric stack as well as a jacket disposed about the electromagnetic shielding layer. The shielding layer may be a copper or copper alloy braid disposed about the multi-dielectric stack. The jacket may be a layer of polypropylene material disposed about the shielding layer.

In another aspect, the present disclosure includes another multi-dielectric video push-cable embodiment that may include a central structural element of a rigid dielectric material selected to achieve targeted elastic modulus for the multi-dielectric video push-cable. The central structural element may be fiberglass in some embodiments. A conductor layer may be disposed about the central structural element. The conductor layer may be a copper or copper alloy braid in some embodiments. The multi-dielectric video push-cable embodiment may further include an impedance tuning layer disposed about the conductor layer having a thickness of material selected to achieve target electromagnetic impedance for the overall multi-dielectric video push-cable. The impedance tuning layer may be polypropylene in some multi-dielectric video push-cable embodiments. The multi-dielectric video push-cable embodiment may further include an electromagnetic shielding layer disposed about the multi-dielectric stack as well as a jacket disposed about the electromagnetic shielding layer. The multi-dielectric video push-cable may further include an electromagnetic shielding layer disposed about the multi-dielectric stack as well as a jacket disposed about the electromagnetic shielding layer. The shielding layer may be a copper or copper alloy braid disposed about the multi-dielectric stack. The jacket may be a layer of polypropylene material disposed about the shielding layer.

In another aspect, the multi-dielectric coaxial video push-cables of the present disclosure may include an insulating wrap layer disposed about the inner conductor. In some embodiments, the insulating wrap layer may be a polytetrafluoroethylene film. The insulating wrap layer may be advantageous in manufacture by improving the ease with which the central conductor may be accessed for coupling to terminations on either end of the push-cable.

In another aspect, the multi-dielectric coaxial video push-cables of the present disclosure may include a friction modifier layer disposed between the shielding layer and jacket. The friction modifier layer may be biaxially-oriented polyethylene terephthalate film or like material preventing friction damage to occur between the shielding layer and jacket.

In another aspect, the present disclosure may include a jetter video push-cable embodiment that may include a central hose element with a conductor layer disposed about the central hose element. In some embodiments, the central hose element may be of electrically conductive material(s) and the conductor layer and central hose element may be one in the same element. The jetter video push-cable embodiment may further include an impedance tuning layer disposed about the conductor layer of a dielectric material having a thickness selected to achieve target electromagnetic impedance for the overall multi-dielectric video push-cable. In some embodiments, the impedance tuning layer may be polypropylene or like dielectric material of a chosen thickness to tune the jetter video push-cable to target impedance. The jetter video push-cable embodiment may further include an electromagnetic shielding layer disposed about the multi-dielectric stack as well as a jacket disposed about the electromagnetic shielding layer. The shielding layer may be a copper or copper alloy braid disposed about the multi-dielectric stack. The jacket may be a layer of polypropylene material disposed about the shielding layer. In some embodiments, a friction modifier layer may be included between the shielding layer and jacket. The friction modifier layer may be biaxially-oriented polyethylene terephthalate film or like material preventing friction damage from occurring between the shielding layer and jacket.

In another aspect, a jetter video push-cable may substitute a multi-dielectric stack comprising multiple concentric tubular layers having one or more structural layers and impedance tuning layers wherein the cumulative properties of the layers have thicknesses selected to achieve targeted elastic modulus and electromagnetic impedance for the overall jetter video push-cable.

In another aspect, the hose element of a jetter video push-cable may directly or indirectly be attached to a source of pressurized water. For instance, the jetter video push-cable may connect to a drum reel which further connects to a source of pressurized water.

In another aspect, the distal end of the jetter video push-cable may couple to a combined jetter tool and camera head. In other embodiments, the distal end of the jetter video push-cable may couple to a camera head and a jetter tool wherein the camera head and a jetter tool are separate elements.

In another aspect, the present disclosure may include a jetter video push-cable embodiment. The jetter video push-cable embodiment may include a video push-cable disposed inside a hose wherein a cavity formed between the video push-cable and hose exists for the conveyance of water. The video push-cable used in such a jetter video push-cable embodiment may be a multi-dielectric push-cable embodiment as described herein. Some jetter video push-cable embodiments may include one or more position elements to restrain and position the video push-cable inside the hose.

In another aspect, the present disclosure may include another jetter video push-cable embodiment. The jetter video push-cable embodiment may include a hose formed with a compartment feature for retaining push-cable elements disposed therein. The hose may further include a cavity for the conveyance of water. In some embodiments, the jetter video push-cable may further include an electromagnetic shielding layer and a jacket.

In another aspect, the present disclosure may include a jetter camera head. The jetter camera head may include a coupling element to secure the jetter camera head to a jetter video push-cable diverting water and conductive elements carrying power and signal to related elements inside the jetter camera head. The jetter camera head may have passages for conveying water to a nozzle element having one or more nozzles for directing and controlling the jet of water. The jetter camera head may further include a camera element having one or more cameras and an illumination element to illuminate the field of view captured by the one or more cameras.

In another aspect, the present disclosure may include a jetter attachment apparatus. The jetter attachment apparatus may include a first coupling element for securing the jetter attachment apparatus to a jetter video push-cable and divert water and conductive elements carrying power and signal to related elements inside the jetter attachment apparatus. The jetter attachment apparatus may further include a nozzle element having one or more nozzles for directing and controlling the jet of water from the jetter attachment apparatus. The jetter attachment apparatus may have one or more passages for conveying water from a jetter video push-cable to the nozzle elements and a conductive element for provisioning of signal and power to a second coupling and further to a camera head. The jetter attachment apparatus may include a second coupling element for securing a camera head to the jetter attachment apparatus.

In another aspect, the present disclosure includes a drum reel having a storage element for storing a jetter video push-cable. The drum reel may include a water input element for connecting the drum reel to a water source, a signal connecting element to connect the drum reel to a CCU, and a combining element for distributing and connecting water and signal carrying element to the jetter video push-cable. In some such embodiments, the water input element and signal connecting element are on opposite faces of the drum reel.

The term "exemplary" is used herein to mean "serving as an example, instance, or illustration." Any aspect and/or embodiment described herein as "exemplary" is not necessarily to be construed as preferred or advantageous over other aspects and/or embodiments.

Example Multi-Dielectric Coaxial and Jetter Video Push-Cable Embodiments

The multi-dielectric coaxial push-cables of the present disclosure may have a mechanical elasticity allowing the push-cable to be pushed into and travel through a pipe or other conduit while being able to flex and travel around bends or turns therein. In system embodiments including such a multi-dielectric coaxial push-cable, the multi-dielectric coaxial push-cables may communicate electrical power and/or data signals between one or more tools, which may generally include a camera head, on the distal end and a control element device on the proximal end of the push-cable. The multi-dielectric coaxial push-cables of the present disclosure may have a multi-dielectric stack including one or more structural layers to achieve targeted elastic modulus and impedance tuning layers to achieve targeted electromagnetic impedance in a multi-dielectric coaxial push-cable having a sufficiently small diameter to fit into and travel through common pipe sizes and/or other confined spaces. The multi-dielectric coaxial push-cables of the present disclosure, having a multi-dielectric stack, may further benefit from an improved loss tangent due to the aggregate loss tangent of materials used in the push-cable over push-cables known in the art using fiberglass or other video push-cables having a singular dielectric material layer. As illustrated in FIG. 1 an exemplary pipe inspection system 100 includes a multi-dielectric coaxial push-cable 110. The system 100 further includes a camera head 120 coupled to the distal end of the multi-dielectric coaxial push-cable 110 and a push-cable storage drum reel 130 and a camera control unit (CCU) 140 along the proximal end of push-cable 110.

Push-cable 110 may be of the various embodiments of push-cables as described subsequently herein (e.g., embodiments 210 of FIGS. 2A and 2B or 310 of FIGS. 3A and 3B), or variations or combinations thereof alone or with additional elements such as those described in the incorporated applications, and may be stored on drum reel 130 when not in use or for storage or transportation.

A video inspection operation such as that which may be performed with the system 100 may begin with the push-cable 110 being dispensed into a pipe 160 (or other cavity, not shown) by drawing the push-cable 110 from the drum reel 130, as well as storing the video push-cable 110 upon retraction from the pipe 160 by feeding it back onto the drum reel 130, either mechanically or manually, by an operator 170. The push-cable 110 provides a mechanical connection between the drum reel 130 at the proximal end of the push-cable 110 and camera head 120 at a distal end, as well as an electrical connection for power and signaling between the camera head 120 and CCU 140 (or other coupled device). An optional coil spring 180 may be positioned around a segment of push-cable 110 at or near the distal end and behind camera head 120 for additional protection and maneuverability to the camera head 120.

During a video inspection imaging operation, the camera head 120 generates inspection data signals corresponding to video and/or still images and/or other inspection data, such as environmental sensor data, location data, orientation data, position data, and/or other data or information, from in pipe 160 (or other cavities into which it is deployed). Such inspection data signals may further be communicated to signal processing, control and/or display elements of the pipe inspection system 100, such as the CCU 140 (or other directly or wirelessly coupled electronic computing devices or systems, such as notebook computer, cellular phones, tablet devices, and the like, not shown), which may be integral with or coupled to the drum reel 130.

Control signals may be generated by CCU 140 and/or other inspection system device(s) for controlling various operations of the camera head 120, such as positioning controls, orientation controls, camera settings, lighting settings, and the like. The CCU 140 may also control various operations of drum reel 130 and/or other wired or wirelessly connected video inspection system devices (not illustrated).

As noted above, the push-cable 110 may carry control signals as well as inspection data signals between camera head 120 and drum reel 130, and may also provide electrical power to camera head 120 from a power source, such as batteries (not illustrated), power generators, AC line power, and the like, which may be on or electrically coupled to CCU 140 and/or drum reel 130. The electrical conductor in the video push cable may share provision of power and signaling.

In some embodiments, video inspection data signals may be communicated to and/or control signals may be provided from other system devices not illustrated in FIG. 1 through a multi-dielectric coaxial push-cable such as cable 110. For example, a laptop, smart phone, tablet computer, utility locator device, and/or other electronic computing device may be used to process received images or video, display pipe inspection imagery and/or data and/or control operations of the various system devices, including camera head 120 as well as other inspection system devices. Multi-dielectric coaxial push-cables as described herein may also be used in other applications where signaling and power are provided from one device to another.

A pipe inspection system that includes a multi-dielectric coaxial push-cable in accordance with the present disclosure, such as push-cable 110 of pipe inspection system 100, may further include additional components or elements not specifically illustrated in FIG. 1. These additional components or elements may be any of the various video inspection system or utility locator system devices or elements as described in the various referenced patents and patent applications incorporated herein. For example, as shown in FIG. 1, a utility locator 190 may be used in conjunction with a video pipe inspection system to determine a location, relative to the ground surface, of the camera head 120 based on magnetic field signals generated from the camera head, or other magnetic field sources, such as from current flowing in wires in the push-cable or buried pipe or other conductors. This may be done by, for example, incorporating a Sonde (not shown) with the video push-cable or camera head, with corresponding Sonde magnetic field signals sensed and processed by the locator to locate the camera head or push-cable under the ground.

Figure 2A:
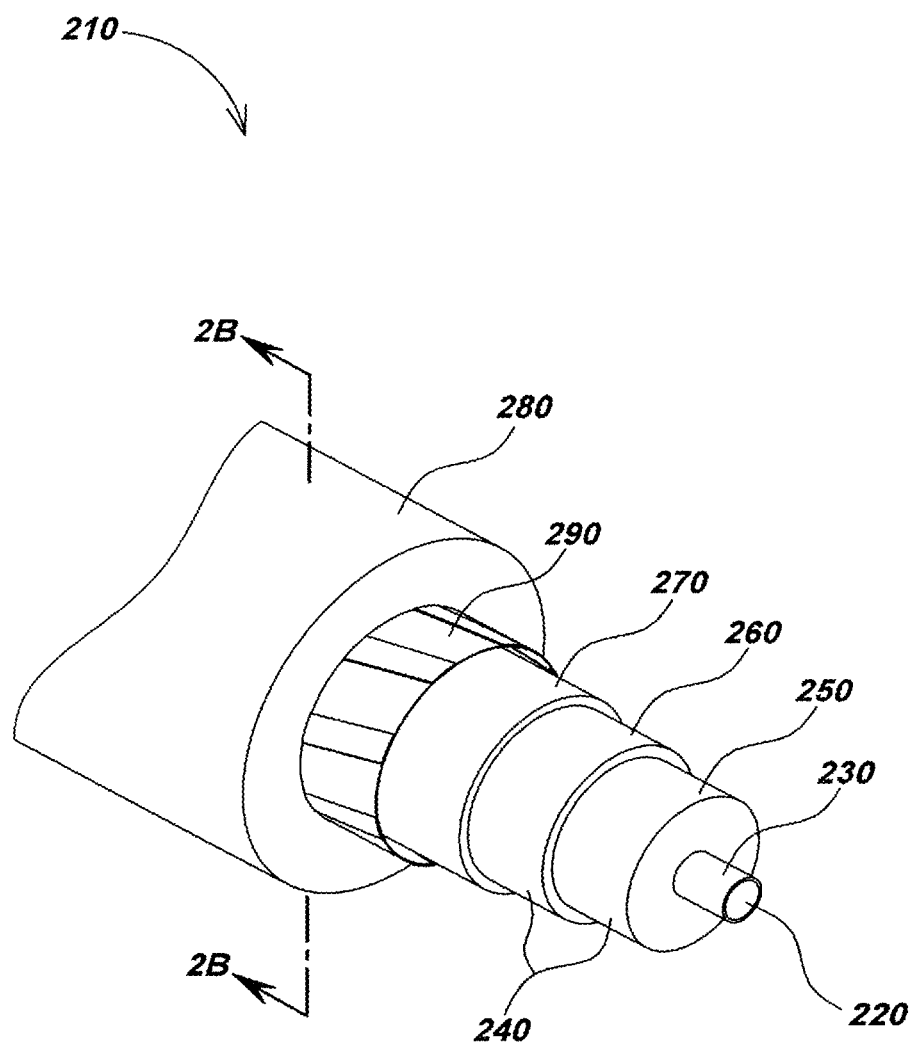
FIG. 2A is a detailed fragmentary isometric view of one embodiment of a multi-dielectric coaxial push-cable.
Figure 2B:
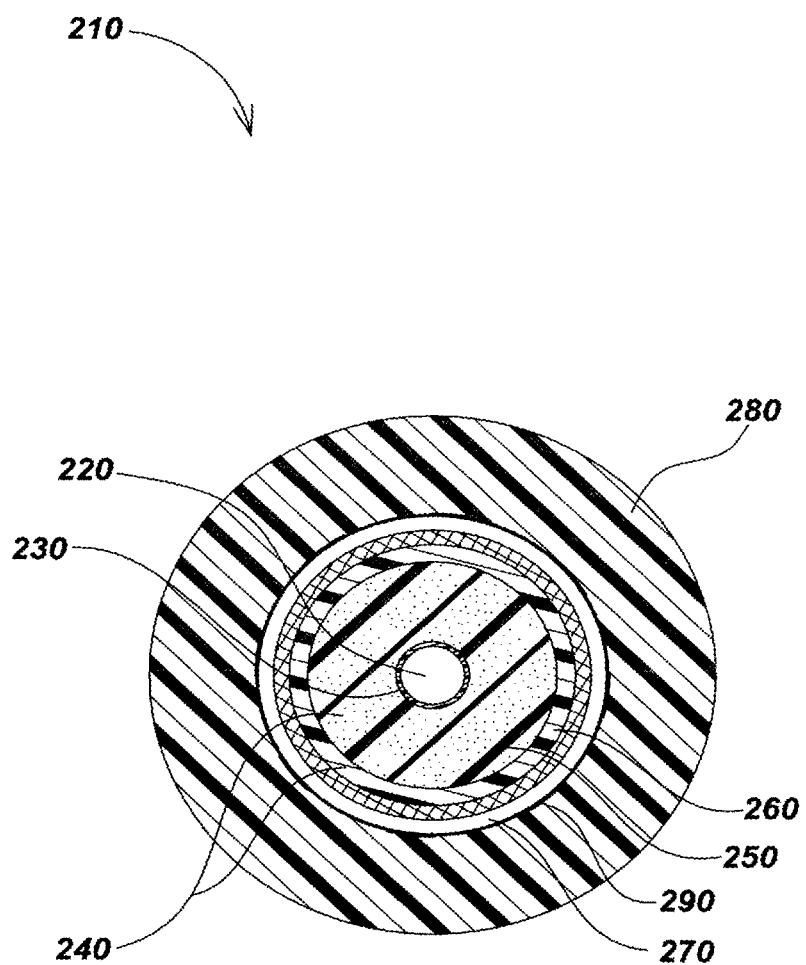
FIG. 2B is a cross-section view of the multi-dielectric coaxial push-cable embodiment of FIG. 2A, taken along line 2B-2B.

Turning to FIGS. 2A and 2B, one embodiment of a multi-dielectric coaxial video push-cable embodiment 210 is illustrated. This push-cable embodiment may correspond to the video push-cable 110 of FIG. 1.

As shown in FIG. 2A, multi-dielectric coaxial push-cable 210 may include a central conductor 220 of copper or copper alloy, silver or silver alloy, copper-clad steel, or other highly conductive material or alloy for transmitting electrical power as well as communicating data signals. The central conductor 220 may optionally be wrapped in an insulating wrap layer 230 which may be a polytetrafluoroethylene film or other like insulating material. The addition of the insulating wrap layer 230 may be advantageous in manufacturing by improving the ease at which the central conductor may be accessed for coupling to terminations on either end of the push-cable 210. Furthermore, such an insulating wrap 230 may aid in ensuring water is prevented from contacting the central conductor 220. A multi-dielectric stack 240 of multiple concentric tubular layers are disposed around the central conductor 220 and optional insulating wrap layer 230 comprising one or more structural layers, such as the structural layer 250, and impedance tuning layers, such as the impedance tuning layer 260. The structural layer 250 and impedance tuning layer 260 may be of dielectric materials wherein the thickness of each material may be selected to achieve targeted elastic modulus and electromagnetic impedance for the push-cable 210. The structural layer 250 may be fiberglass or like dielectric material having a favorable elastic modulus for use in a push-cable. The central conductor 220 may be between one eighth and five eighths of the diameter of a surrounding structural layer 250. The impedance tuning layer 260 may be polypropylene or like dielectric material having a lower dielectric constant than that of the structural layer 250. The aggregate dielectric property of the dielectric stack 240 may provide an improved capacitance for the central conductor 220 and allow for a larger diameter central conductor 220 for a smaller diameter push-cable 210 versus a common coaxial cable or other video push-cables. Likewise, the thickness of the impedance tuning layer 260 may be changed to tune the dielectric coaxial push-cable 210 to achieve target electromagnetic impedance. The tuning of the dielectric coaxial push-cable 210 to achieve target electromagnetic impedance may factor into the dielectric properties of the optional insulating wrap layer 230. For instance, the central conductor 220 of the multi-dielectric coaxial push-cable 210 may be an eighteen gauge copper wire surrounded by an insulating wrap layer 230 of polytetrafluoroethylene film. The structural layer 250 of the surrounding dielectric stack 240 may be 4 mm fiberglass and the impedance tuning layer 260 may be a 0.5 mm layer of polypropylene. The push-cable 210 embodiment of FIGS. 2A and 2B may have target 50 ohms electromagnetic impedance. The multi-dielectric coaxial push-cable 210 may further include an electromagnetic shielding layer 270 which may be of an electromagnetically conductive material or alloy. The shielding layer 270 of FIGS. 2A and 2B may be copper braid though in other embodiments other conductive materials may be used. A jacket 280, which may be polypropylene or like durable materials, may be the outmost layer of the multi-dielectric coaxial push-cable 210 to protect the internal layers from the external environment. The multi-dielectric coaxial push-cable 210 may include a friction modifier layer 290 disposed between the shielding layer 270 and jacket 280. The friction modifier layer 290 may be biaxially-oriented polyethylene terephthalate film or like material preventing friction damage to occur between the shielding layer and jacket.

Figure 3A:
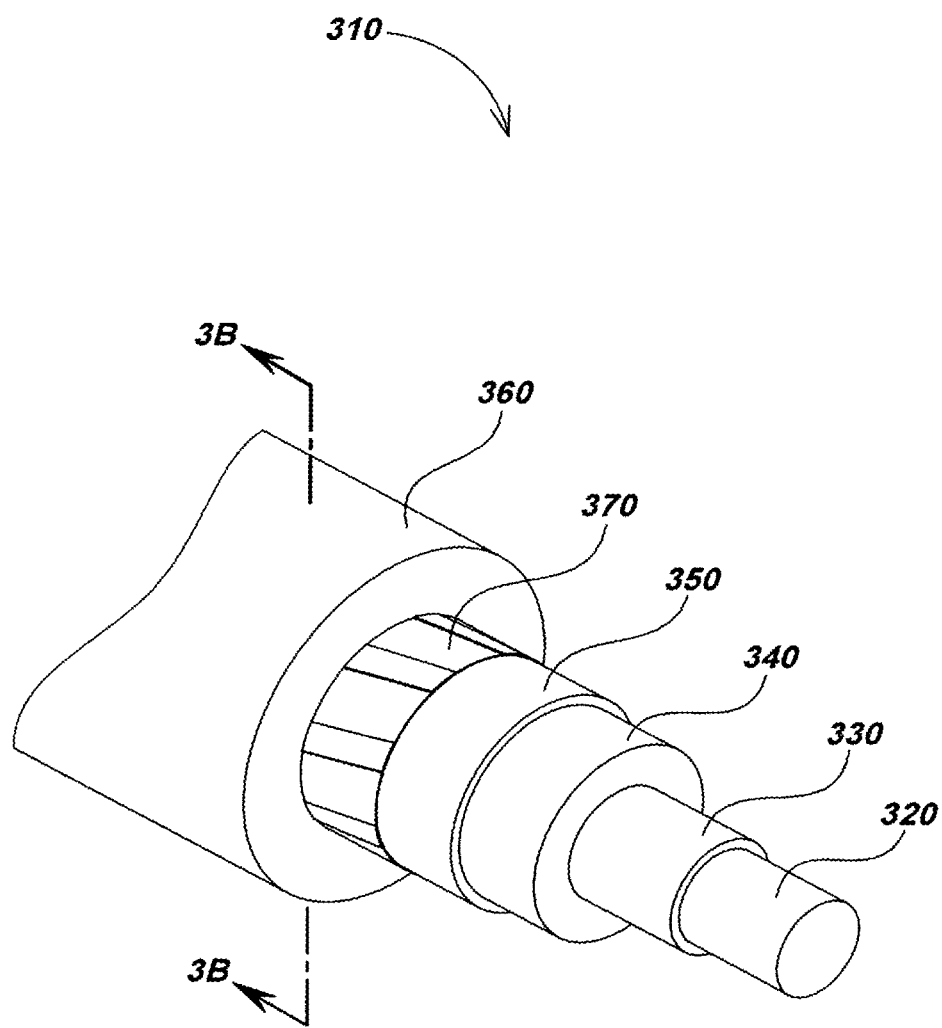
FIG. 3A is a detailed fragmentary isometric view of another embodiment of a multi-dielectric coaxial push-cable in accordance with certain aspects.
Figure 3B:
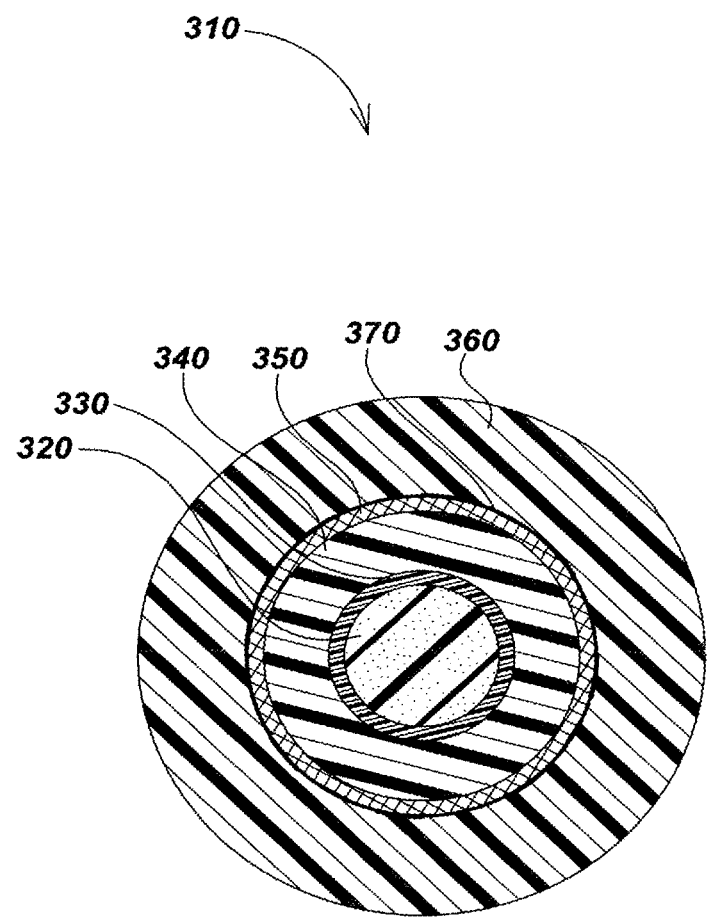
FIG. 3B is a cross-section view of the video push-cable embodiment of FIG. 3A, taken along line 3B-3B.

Turning to FIGS. 3A and 3B, another embodiment of a multi-dielectric coaxial video push-cable embodiment 310 is illustrated. This push-cable embodiment may correspond to the video push-cable 110 of FIG. 1.

As shown in FIGS. 3A and 3B, the multi-dielectric coaxial push-cable 310 a central structural element, such as structural element 320, comprising dielectric material selected to achieve targeted elastic modulus for the coaxial push-cable 310. The structural element 320 may be fiberglass or like material selected to achieve targeted elastic modulus for the push-cable 310. The multi-dielectric coaxial push-cable 310 may further include a tubular conductor layer 330 surrounding the structural element 320. In various push-cable embodiments, the conductor layer may, for example, be or include copper or copper alloy, silver or silver alloy, copper-clad steel, or other highly conductive material or alloy for transmitting electrical power as well as communicating data signals. The conductor layer 330 of the multi-dielectric coaxial push-cable 310 of FIGS. 3A and 3B may be copper braid. An impedance tuning layer 340 may be disposed about the conductor layer 330 comprising dielectric material having a thickness of material selected to achieve target electromagnetic impedance for the push-cable 310. The impedance tuning layer 340 of the multi-dielectric coaxial push-cable 310 may be polypropylene. In other embodiments, other dielectric materials may be used wherein the thickness of material may be selected to achieve target electromagnetic impedance for the push-cable. In some embodiments, a wrap of polytetrafluoroethylene film or like dielectric insulating material may be disposed between the conductor layer, such as the conductor layer 330 of FIGS. 3A and 3B, and the impedance tuning layer, such as the impedance tuning layer 340 of FIGS. 3A and 3B. The addition of such an insulating wrap layer may be advantageous in manufacturing by improving the ease at which the conductor (e.g., conductor layer 330) may be accessed for coupling to terminations on either end of the push-cable 310. Furthermore, such an insulating wrap may aid in ensuring water is prevented from contacting the conductor (e.g., conductor layer 330). The multi-dielectric coaxial push-cable 310 of FIGS. 3A and 3B may further include a shielding layer 350 disposed about the impedance tuning layer 340. The shielding layer 350 may be of an electromagnetically conductive material or alloy. The shielding layer 350 of the multi-dielectric coaxial push-cable 310 of FIGS. 3A and 3B may be copper braid though in other embodiments other conductive materials may be used. A jacket 360, which may be polypropylene or like durable materials, may be the outmost layer of the multi-dielectric coaxial push-cable 310 to protect the internal layers from the external environment. The multi-dielectric coaxial push-cable 310 may include a friction modifier layer 370 disposed between the shielding layer 350 and jacket 360. The friction modifier layer 370 may be biaxially-oriented polyethylene terephthalate film or like material preventing friction damage to occur between the shielding layer 350 and jacket 360.

Figure 4A:
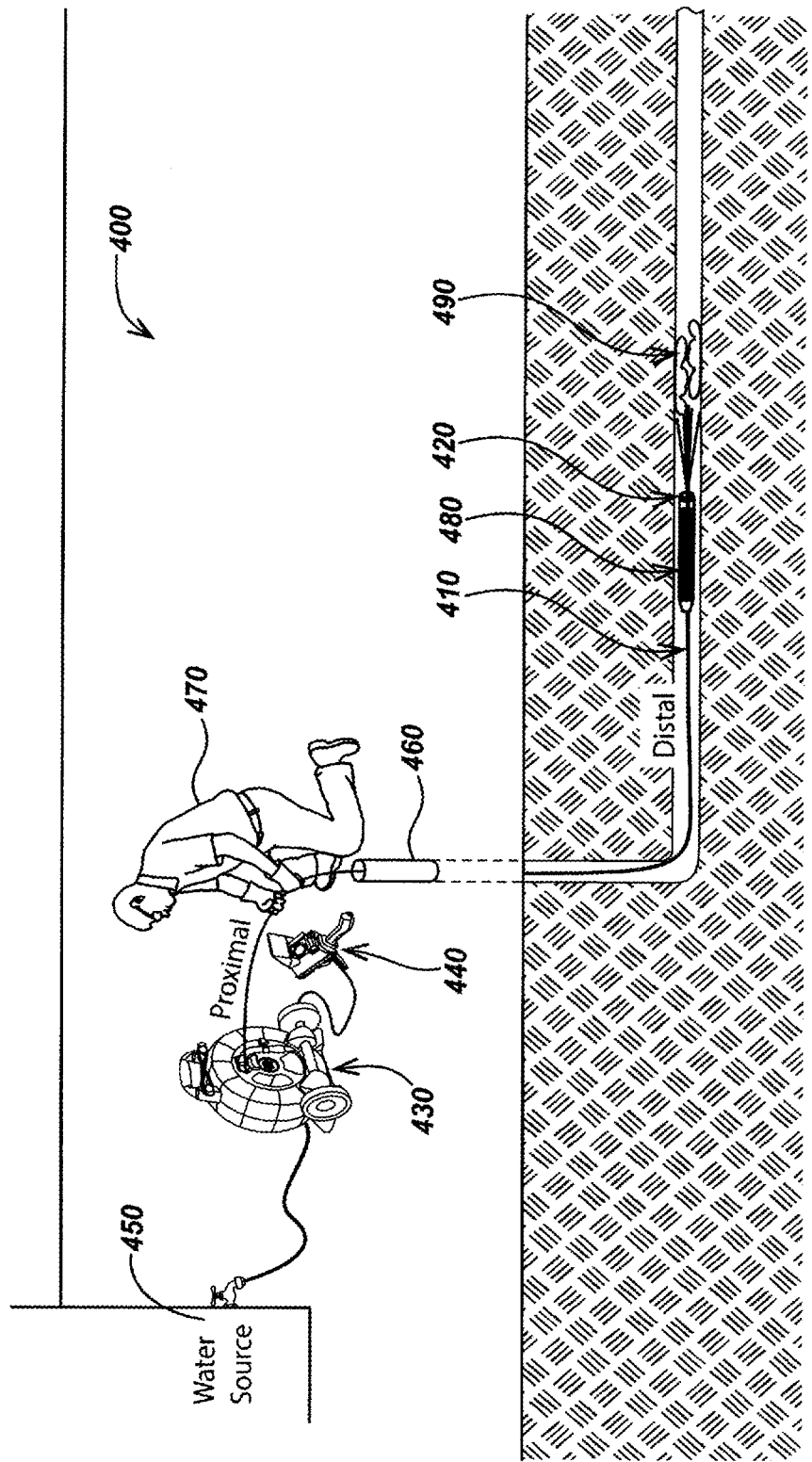
FIG. 4A illustrates details of an embodiment of a pipe inspection and jetter system configured with a multi-dielectric coaxial push-cable in accordance with certain aspects.

The tuning of electromagnetic impedance may be achieved by push-cable embodiments in keeping with the present disclosure having both the functionality of a video push-cable capable of generating video or images from in a pipe and a jetter push-cable capable of forcing pressurized water into the pipe to clear away obstructions. As illustrated in FIG. 4A, an exemplary pipe inspection and jetter system 400 includes a jetter video push-cable 410 having both the functionality of a video push-cable and a jetter push-cable. The system 400 further includes a combined jetter camera head 420 coupled to the distal end of the multi-dielectric coaxial push-cable 410.

Figure 4B:
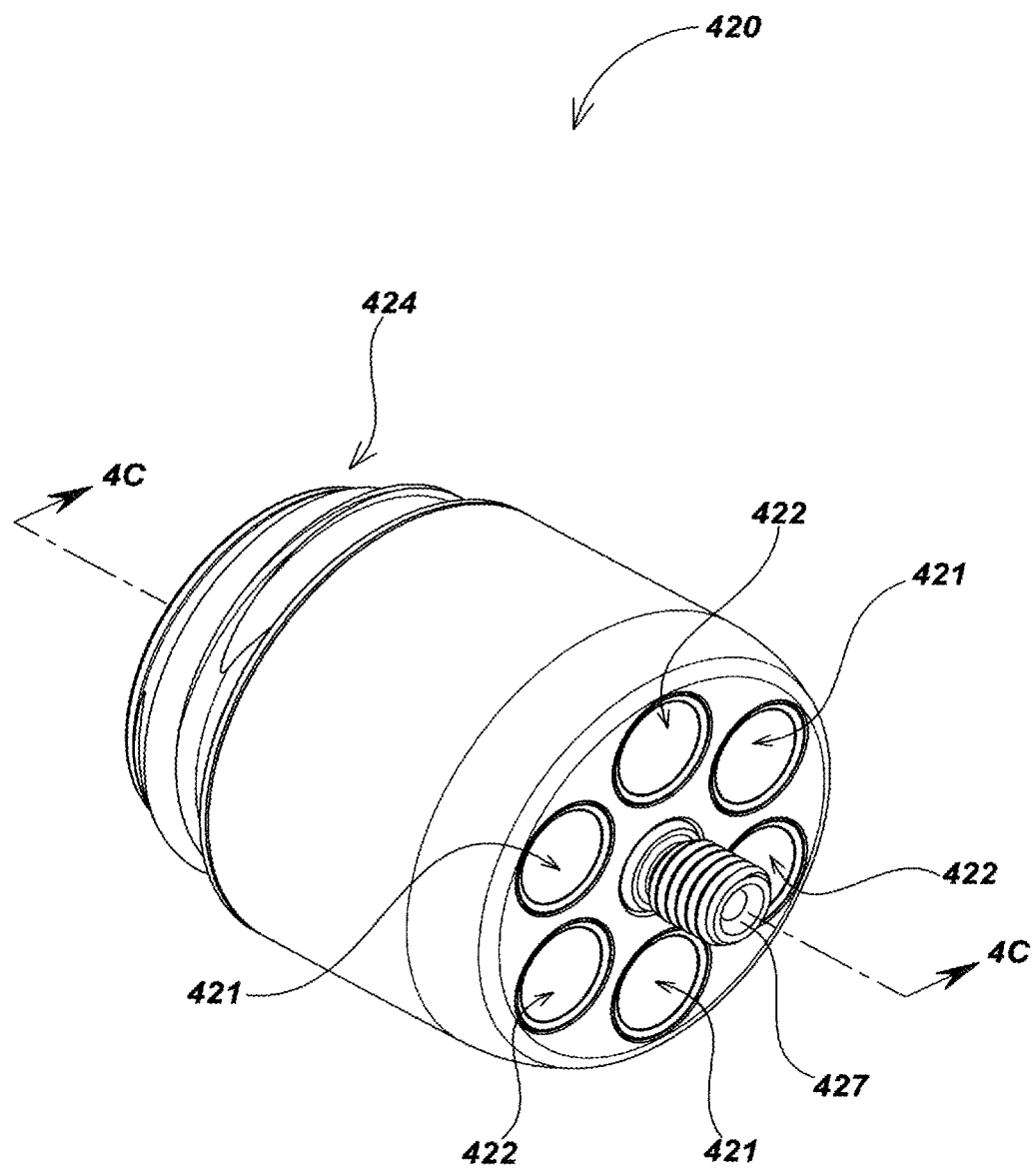
FIG. 4B is an isometric view of a jetter camera head from FIG. 4A.
Figure 4C:
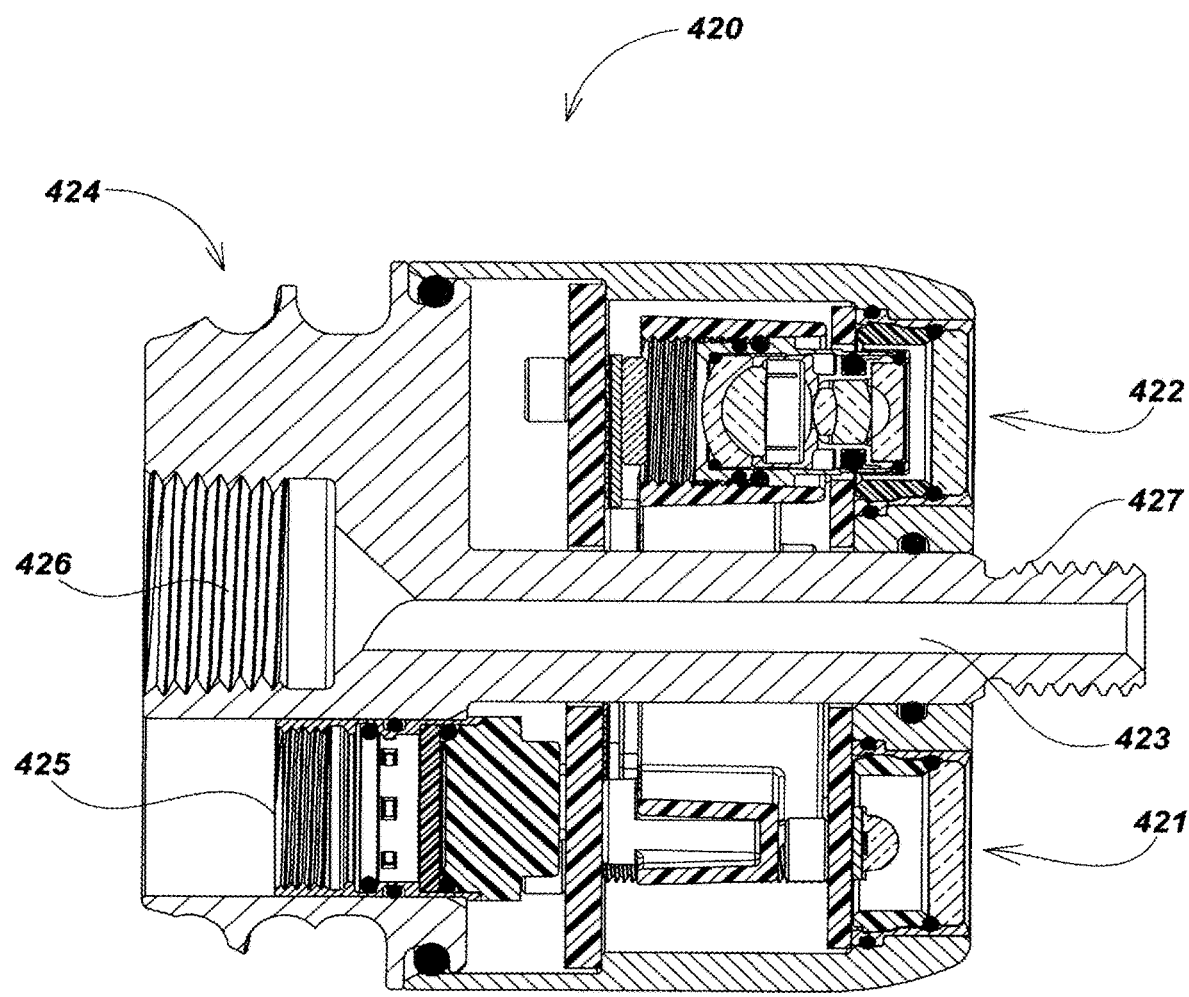
FIG. 4C is a cross-section view of the jetter camera head from FIG. 4B, taken along line 4C-4C.

As illustrated in FIGS. 4B and 4C, the jetter camera head 420 may include one or more lighting elements 421 and cameras 422 to illuminate and generate video or other images from in pipes or other conduits which may further be communicated back to one or more devices (e.g., CCU 440 of FIG. 4A) coupled at the proximal end of push-cable 410 (FIG. 4A). The jetter camera head 420 may further include a passage 423 (illustrated in FIG. 4C) allowing the flow of water to pass through jetter camera head 420. The passage 423 may be watertight in preventing the ingress of water into the portion of the jetter camera head 420 containing the cameras 422, lighting elements 421, and other associated electronics therein. A termination port 424 (FIG. 4C) may allow a jetter video push-cable, such as the push-cable 410 of FIG. 4A or push-cable 510 of FIGS. 5A and 5B, to be connected establishing a separate electrical connection 425 and hose connection 426 for the provisioning of power and communication of signals and conveyance of water from push-cable to the jetter camera head 420. The water may flow through the passage 423 (FIG. 4C) of jetter camera head 420 to a nozzle element 427 for controlling and directing the jet of water. In some embodiments, a jetter camera head may further include a water directing element allowing the water to be aimed in the pipe or other conduit for removing obstruction therein. In other embodiments, the jetter and camera head may be two separate elements such that a jetter video push-cable in keeping with the present disclosure may connect separately to a camera and to a jetter tool or apparatus. For instance, the nozzle element 427 may include or instead be a feature having threads or other coupling features to allow the coupling of other jetter tools or apparatus wherein the jet of water is directed or otherwise controlled through the attached jetter tools or other apparatus. The nozzle element 427 of jetter camera head 420 is illustrated as extending centrally from in the jetter camera head 420. In other embodiments, the nozzle or other water spraying element may be routed outside or between lighting elements and cameras.

Returning back to FIG. 4A, the system 400 further includes a push-cable storage drum reel 430 and a camera control unit (CCU) 440 coupled along the proximal end of push-cable 410. A pressurized water source 450 which may, for example, come from a water spigot or pressurized water tank or other source may also couple to the proximal end of the jetter video push-cable 410 either directly to the push-cable 410 or first via the drum reel 430.

Push-cable 410 may be of the various embodiments of push-cables as described subsequently herein (e.g., embodiments 510 of FIGS. 5A and 5B), or variations or combinations thereof alone or with additional elements such as those described in the incorporated applications), and may be stored on drum reel 430 when not in use or for storage or transportation.

A video inspection and jetter operation such as that which may be performed with the system 400 may begin with the push-cable 410 being dispensed into a pipe 460 (or other cavity, not shown) by drawing the push-cable 410 from the drum reel 430, as well as storing the video push-cable 410 upon retraction from the pipe 430 by feeding it back onto the drum reel 430, either mechanically or manually, by an operator 470. The push-cable 410 provides a mechanical connection between the drum reel 430 at the proximal end of the push-cable 410 and jetter camera head 420 at a distal end, as well as an electrical connection for power and signaling between the jetter camera head 420 and CCU 440 (or other coupled device). An optional coil spring 480 may be positioned around a segment of push-cable 410 at or near the distal end and behind camera head 420 for additional protection and maneuverability to the jetter camera head 420.

During a video inspection and jetter operation, the jetter camera head 420 generates inspection data signals corresponding to video and/or still images and/or other inspection data, such as environmental sensor data, location data, orientation data, position data, and/or other data or information, from in pipe 460 (or other cavities into which it is deployed). Such inspection data signals may further be communicated to signal processing, control and/or display elements of the pipe inspection system 400, such as the CCU 440 (or other directly or wirelessly coupled electronic computing devices or systems, such as notebook computer, cellular phones, tablet devices, and the like, not shown), which may be integral with or coupled to the drum reel 430. Upon identifying an obstruction in the pipe 460 (or other cavities into which it is deployed), such as obstruction 490, pressurized water may be made to be released through the jetter camera head 420 to forcibly clear away the obstruction 490.

As noted above, the push-cable 410 may carry control signals as well as inspection data signals between camera head 420 and drum reel 430, and may also provide electrical power to camera head 420 from a power source, such as batteries (not illustrated), power generators, AC line power, and the like, which may be on or electrically coupled to CCU 440 and/or drum reel 430. The electrical conductor in the video push cable may share provision of power and signaling.

Control signals may be generated by CCU 440 and/or other inspection system device(s) for controlling various operations of the jetter camera head 420, such as positioning controls, orientation controls, camera settings, lighting settings, and the like. The CCU 440 may also control various operations of drum reel 430 and/or other wired or wirelessly connected video inspection system devices (not illustrated). Some control signals may include those to initiate, direct, and otherwise control water flow through and/or to the jetter camera head 420 and/or other jetter functionality.

Figure 5A:
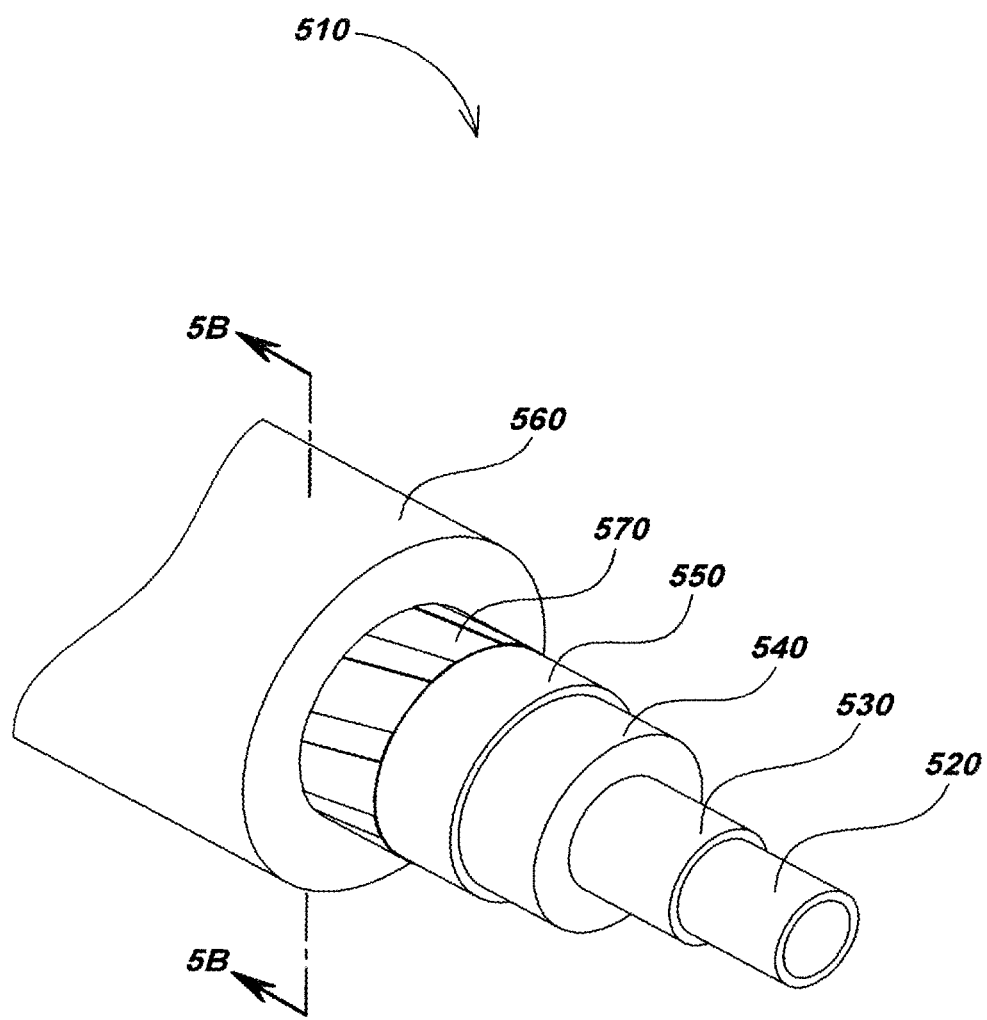
FIG. 5A is a detailed fragmentary isometric view of one embodiment of a jetter video push-cable.
Figure 5B:
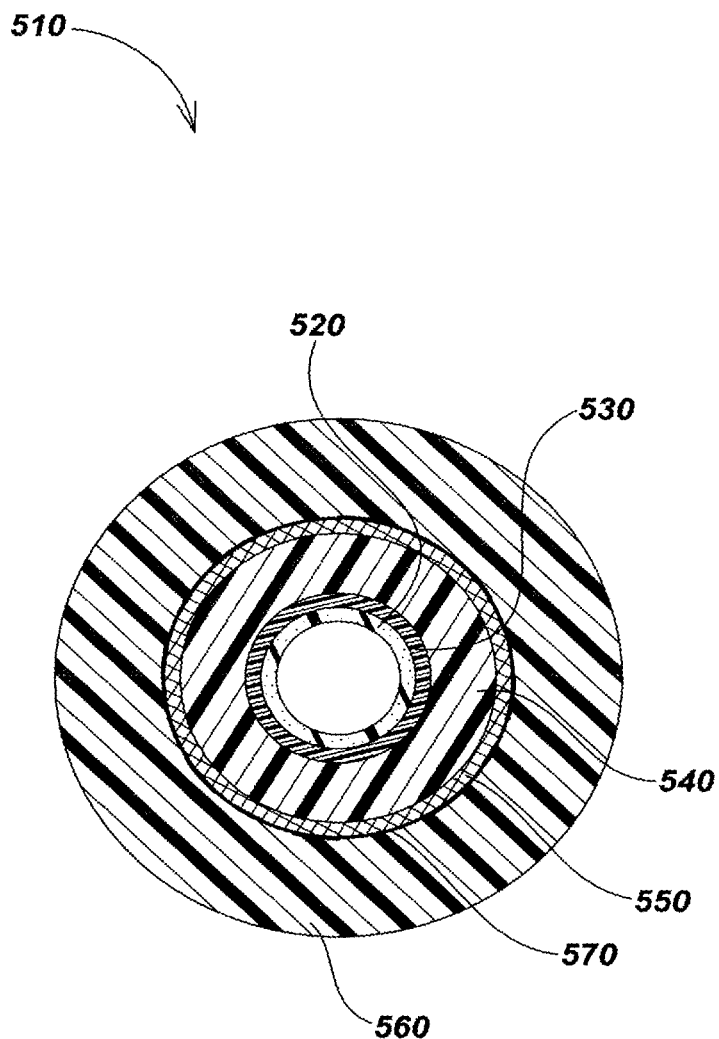
FIG. 5B is a cross-section view of the jetter video push-cable embodiment of FIG. 5A, taken along line 5B-5B.

Turning to FIGS. 5A and 5B, another embodiment of a jetter video push-cable embodiment 510 is illustrated. This jetter video push-cable 510 embodiment may correspond to the video push-cable 410 of FIG. 4A.

As shown in FIGS. 5A and 5B, the jetter video push-cable 510 includes a central hose, such as hose 520, which may allow the conveyance of water through and to a jetter camera head, such as the jetter camera head 420 of FIGS. 4A-4C, or to another jetter tool or apparatus (not illustrated). The jetter video push-cable 510 may further include a tubular conductor layer 530 surrounding the hose 520. In various push-cable embodiments, the conductor layer may, for example, be or include copper or copper alloy, silver or silver alloy, copper-clad steel, or other highly conductive material or alloy for transmitting electrical power as well as communicating data signals. The conductor layer 530 of the jetter video push-cable 510 of FIGS. 5A and 5B may be copper braid. An impedance tuning layer 540 may be disposed about the conductor layer 530 comprising dielectric material having a thickness of material selected to achieve target electromagnetic impedance for the push-cable 510. The impedance tuning layer 540 of the jetter video push-cable 510 may be polypropylene. In other embodiments, other dielectric materials may be used wherein the thickness of material may be selected to achieve target electromagnetic impedance for the push-cable. In some embodiments, a wrap of polytetrafluoroethylene film or like dielectric insulating material may be disposed between the conductor layer, such as the conductor layer 530 of FIGS. 5A and 5B, and the impedance tuning layer, such as the impedance tuning layer 540 of FIGS. 5A and 5B. The addition of such an insulating wrap layer may be advantageous in manufacturing by improving the ease at which the conductor (e.g., conductor layer 530) may be accessed for coupling to terminations on either end of the push-cable 510. Furthermore, such an insulating wrap may aid in ensuring water is prevented from contacting the conductor (e.g., conductor layer 530). The jetter video push-cable 510 of FIGS. 5A and 5B may further include a shielding layer 550 disposed about the impedance tuning layer 540. The shielding layer 550 may be of an electromagnetically conductive material or alloy. The shielding layer 550 of the jetter video push-cable 510 of FIGS. 5A and 5B may be copper braid though in other embodiments other conductive materials may be used. A jacket 560, which may be polypropylene or like durable materials, may be the outmost layer of the jetter video push-cable 510 to protect the internal layers from the external environment. The jetter video push-cable 510 may include a friction modifier layer 570 disposed between the shielding layer 550 and jacket 560. The friction modifier layer 570 may be biaxially-oriented polyethylene terephthalate film or like material preventing friction damage to occur between the shielding layer 560 and jacket 570. Other combinations of the elements, components, features, and/or functions described previously herein may be combined in various embodiments. In addition, details regarding additional aspects, elements, components, features, functions, apparatus, and/or methods which may be used in additional embodiments in conjunction with disclosures herein are described in the co-assigned incorporated applications.

Figure 6A:
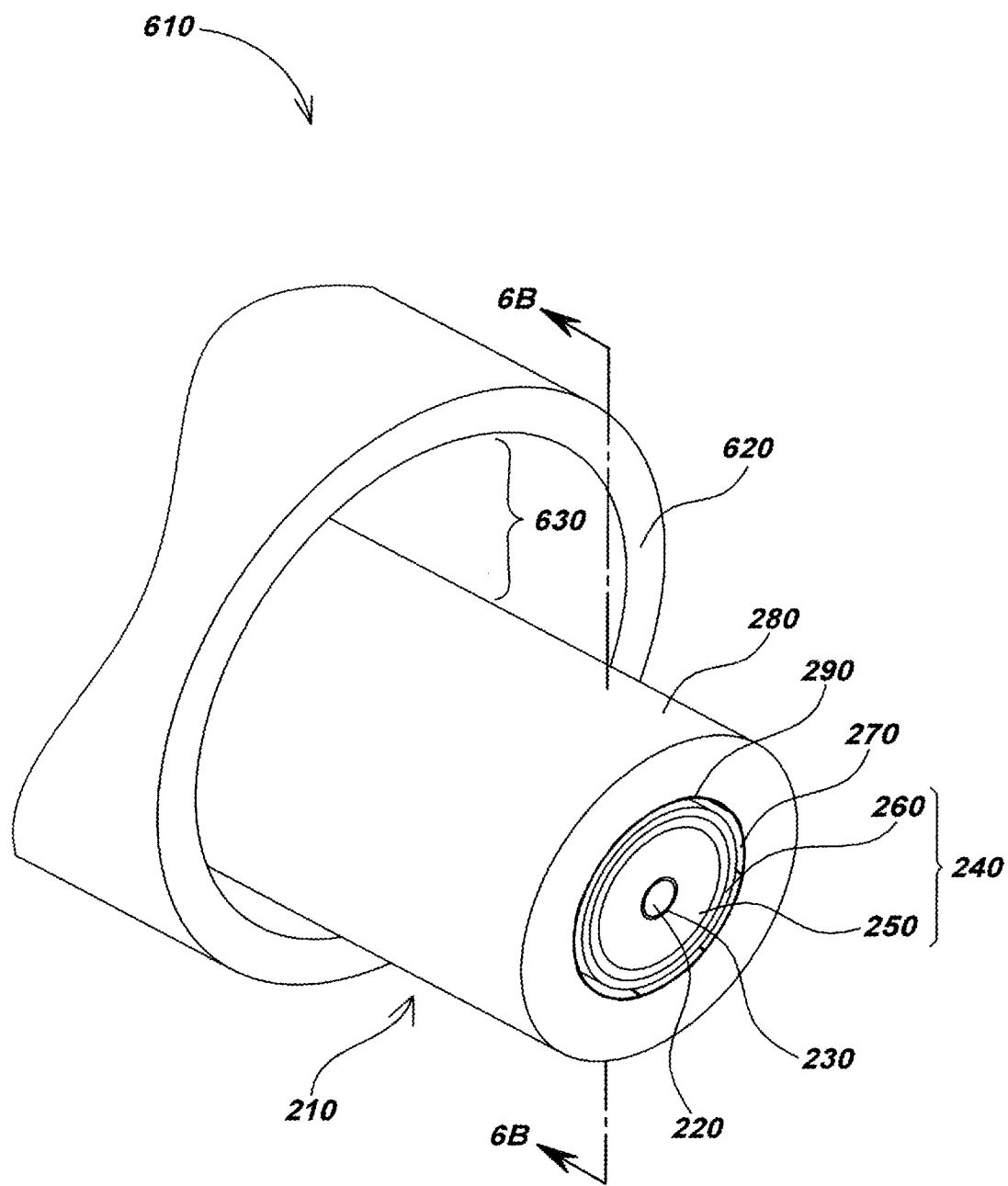
FIG. 6A is a detailed fragmentary isometric view of one embodiment of a jetter video push-cable.
Figure 6B:
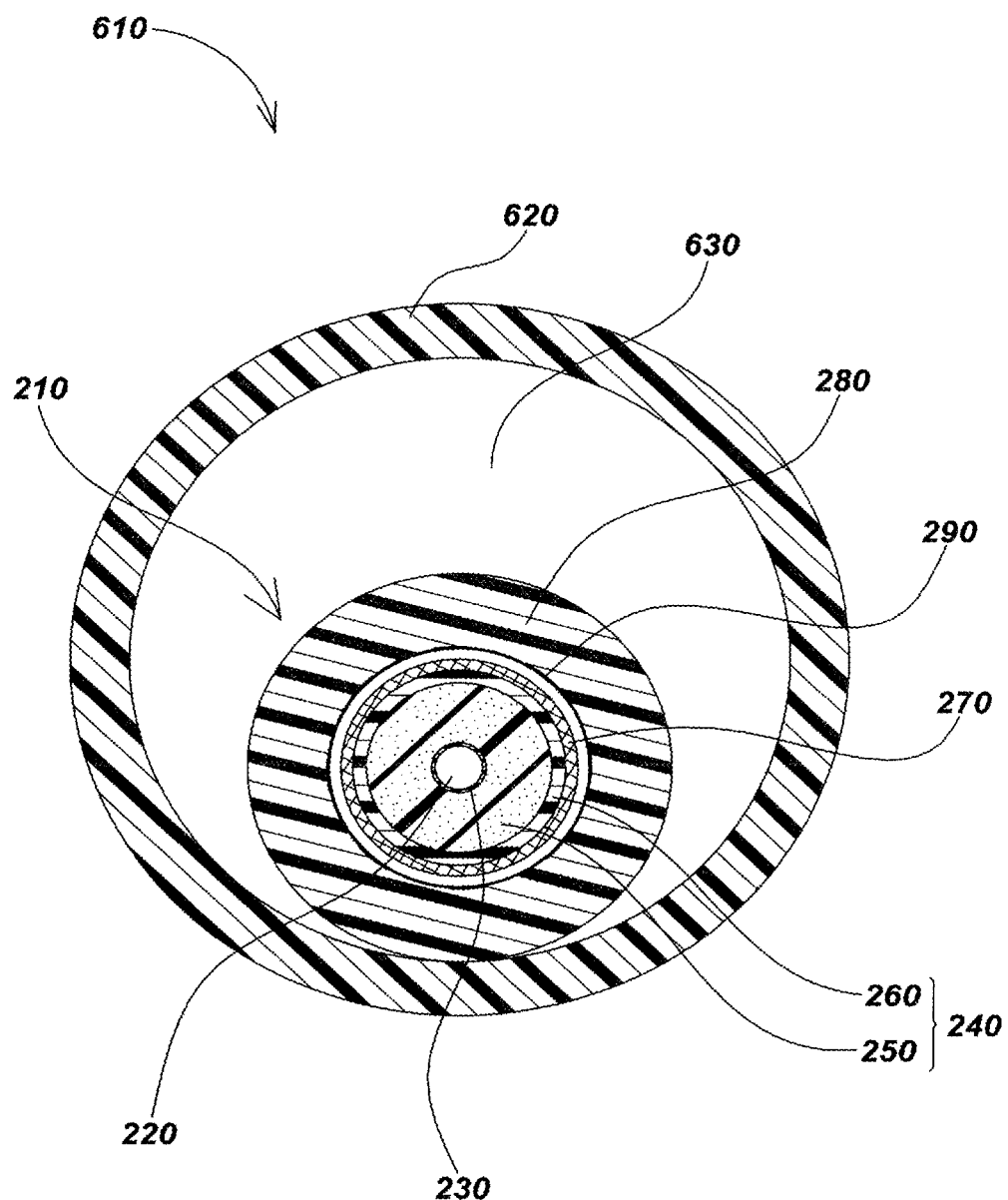
FIG. 6B is a cross-section view of the jetter video push-cable embodiment of FIG. 6A, taken along line 6B-6B.

Turning to FIGS. 6A and 6B, another embodiment of a jetter video push-cable embodiment 610 is illustrated. Embodiment 610 may include a video push-cable, such as the multi-dielectric coaxial push-cable 210 as described in previous sections herein, disposed in a hose 620. A hollow cavity 630 may exist between the push-cable 210 and the surrounding hose 620 allowing the conveyance of water from a water source to flow through the jetter video push-cable embodiment 610 to a jetter camera head, such as the jetter camera head 720 of FIGS. 7A and 7B. In other embodiments, any video push-cable may be substituted for the multi-dielectric coaxial push-cable 210 disposed in hose 620 given that a cavity for conveying water may exist between the push-cable embodiment and hose 620.

In some jetter video push-cable embodiment 610 illustrated in FIGS. 6A and 6B, the video push-cable 210 may be unrestrained inside hose 620. In other like jetter video push-cable embodiments, one or more positioning elements may be included to restrain the video push-cable to a desired position inside the hose.

Figure 6C:
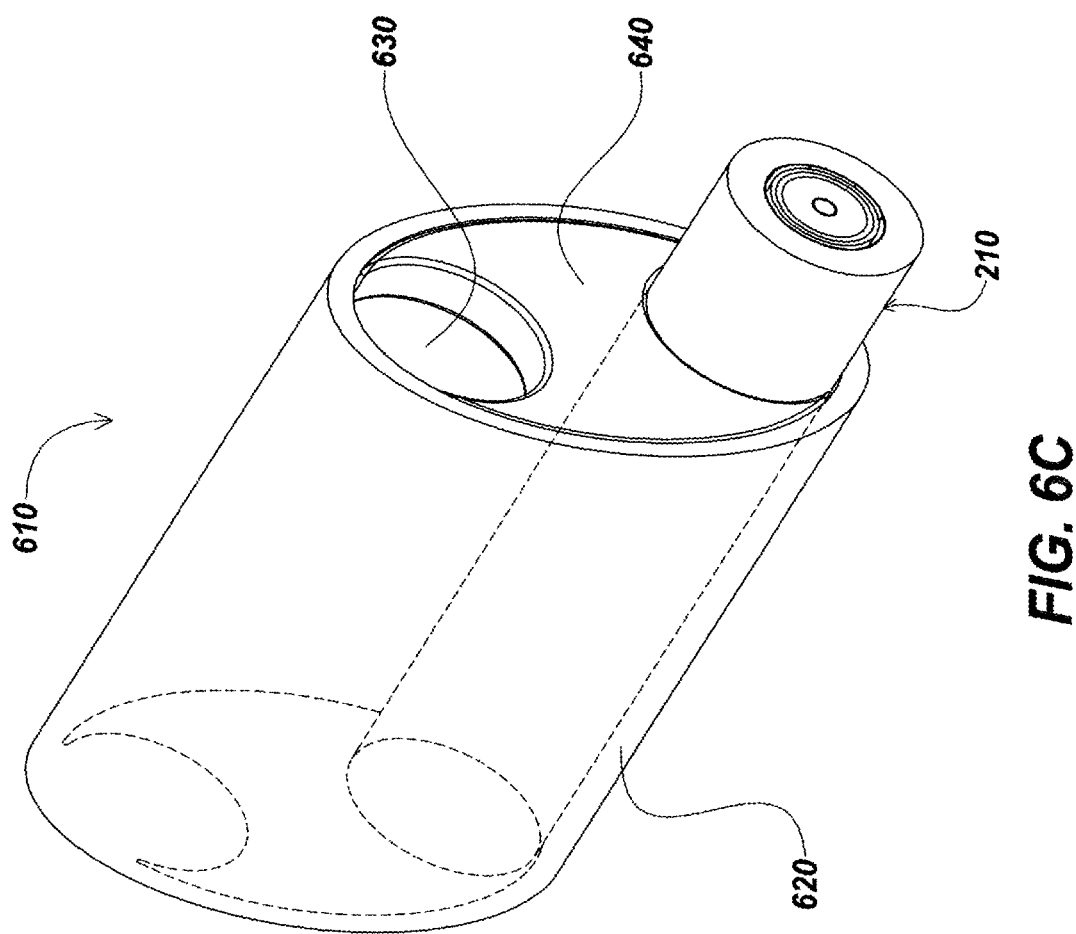
FIG. 6C is the jetter video push-cable from FIG. 6A including a positioning element.
Figure 6D:
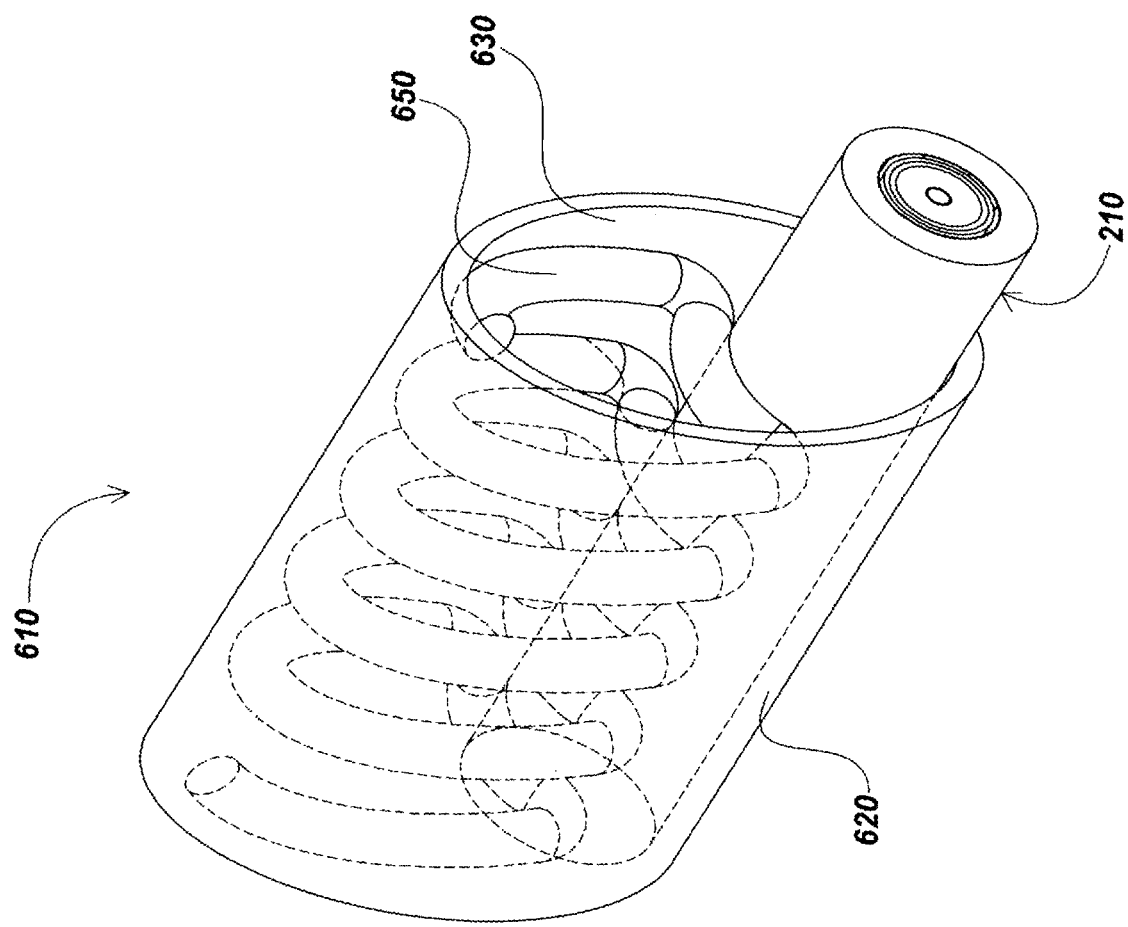
FIG. 6D is the jetter video push-cable from FIG. 6A including another positioning element.

In FIGS. 6C-6E the jetter video push-cable embodiment 610 is illustrated including various position element embodiments (position element 640 of FIG. 6C, position element 650 of FIG. 6D, and position element 660 of FIG. 6E). The position element 640 of FIG. 6C, position element 650 of FIG. 6D, and position element 660 of FIG. 6E may each position the video push-cable 210 inside the hose 620. For instance, the position element 640 of FIG. 6C and position element 650 of FIG. 6D may position the video push-cable 210 off centered and off to one side in the hose 620. The position elements 640 of FIG. 6C includes a series of brackets that may restrain the video push-cable 210 to an off centered position inside the hose 620. The position element 650 of FIG. 6D may be a helical coil spring dimensioned to fit securely inside the hose 620 and force the hose 620 to an off centered position. The position element 660 of FIG. 6E may position the video push-cable 210 centered in hose 620. The position element 660 of FIG. 6E may include a series of brackets that may hold the video push-cable 210 centered inside hose 620. Each position element 640 of FIG. 6C, position element 650 of FIG. 6D, and position element 660 of FIG. 6E may maintain the cavity 630 allowing the conveyance of water. In other embodiments, other brackets or other position elements may be used to restrain a video push-cable to a desired position inside the hose.

Figure 7A:
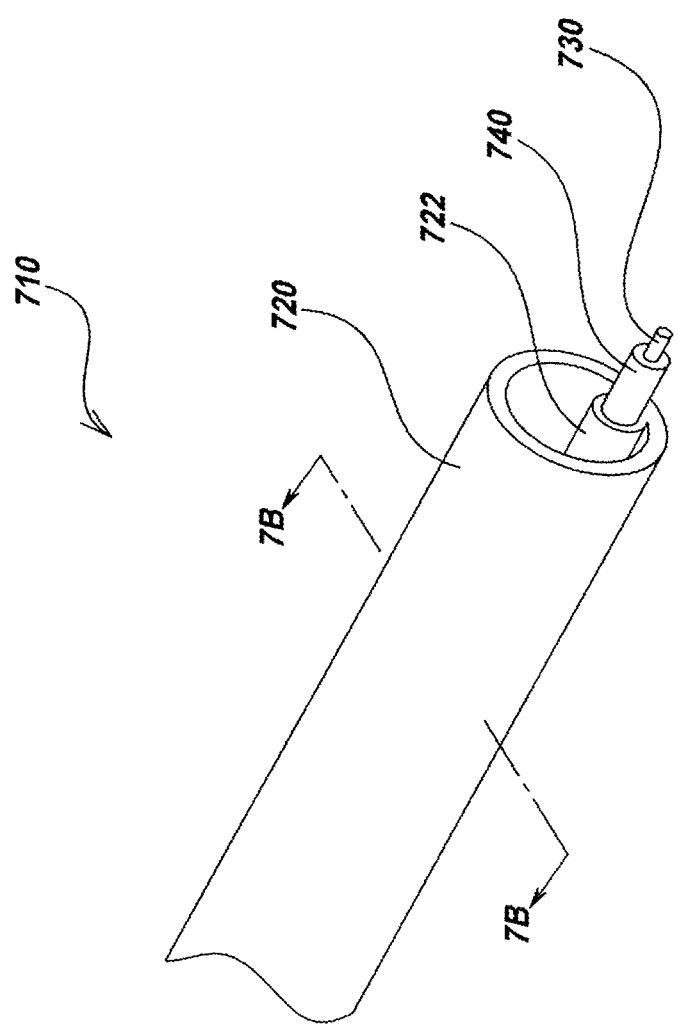
FIG. 7A is a detailed fragmentary isometric view of one embodiment of a jetter video push-cable.
Figure 7B:
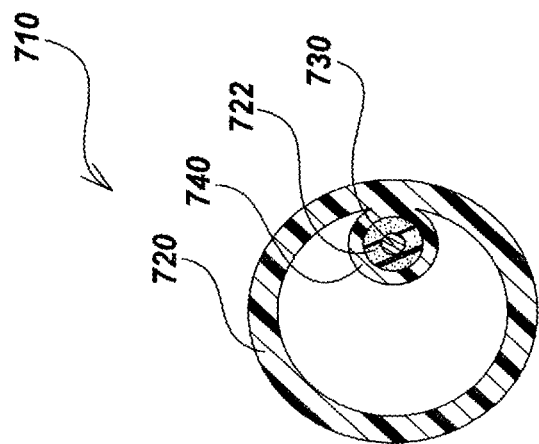
FIG. 7B is a cross-section view of the jetter video push-cable embodiment of FIG. 7A, taken along line 7B-7B.

In some jetter video push-cable embodiments, the hose may be formed with a compartment to retain a video push-cable or various elements comprising a video push-cable. As illustrated in FIGS. 7A and 7B, a jetter video push-cable 710 in keeping with the present disclosure may include a hose 720 formed with a push-cable compartment feature 722 which may retain video push-cable elements. The video push-cable elements of jetter video push-cable embodiment may include a conductor and a structural layer. For instance, the video push-cable elements of jetter video push-cable embodiment 710 may include a conductor 730 disposed inside a structural layer 740. The conductor 730 may be copper or a copper alloy, copper clad steel, silver or a silver alloy, or other electrically conductive material. The structural layer 740 may be fiberglass or polypropylene or other dielectric material having a favorable elastic modulus. In yet further embodiments, the video push-cable elements retained inside a push-cable compartment feature such as the push-cable compartment feature 722 may be any video push-cable embodiment disclosed herein. The jetter video push-cable 710 may further include a hollow cavity 750 inside the hose 720 allowing the conveyance of water from a water source to flow through the jetter video push-cable embodiment 710 to a jetter camera head, such as the as the jetter camera head 1020 of FIGS. 10A and 10B and jetter attachment apparatus and camera head 1120 of FIGS. 11A and 11B. In some embodiments, such as the jetter video push-cable 710 of FIG. 7B, a friction modifier layer (not illustrated) comprising of talc or like friction reducing materials may be included between the structural layer 740 and the push-cable compartment feature 722 of hose 720.

Figure 8A:
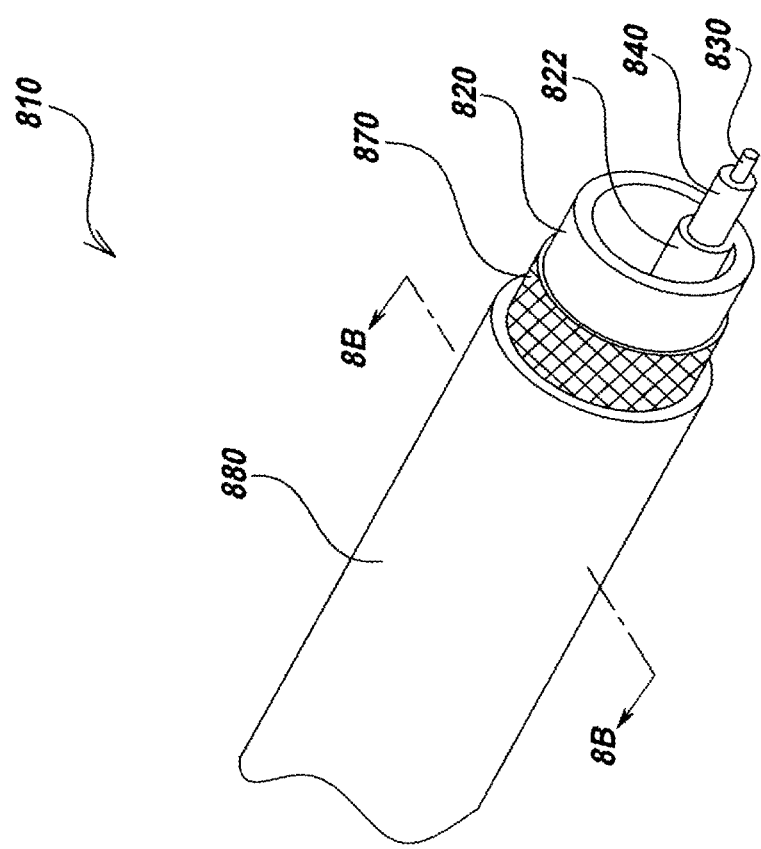
FIG. 8A is a detailed fragmentary isometric view of one embodiment of a jetter video push-cable.
Figure 8B:
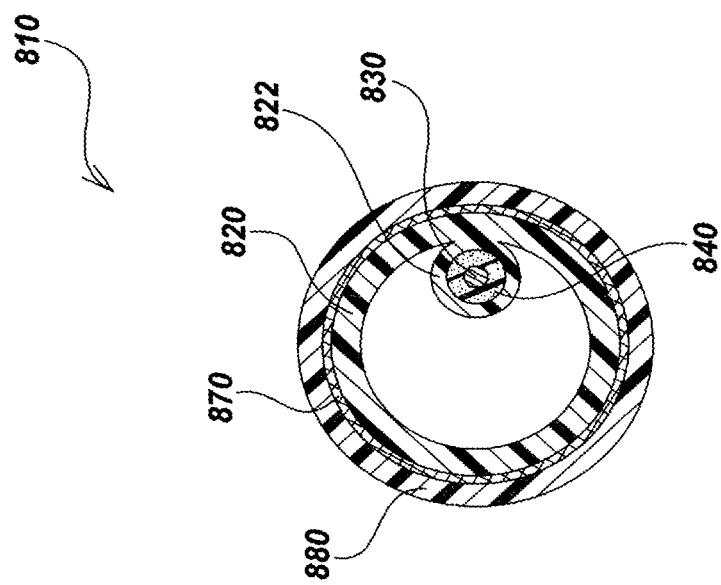
FIG. 8B is a cross-section view of the jetter video push-cable embodiment of FIG. 8A, taken along line 8B-8B

In further embodiments, a shielding layer and jacket layer may be disposed about the jetter video push-cable 710. As illustrated in FIGS. 8A and 8B, a jetter video push-cable embodiment 810 may include a hose 820 formed with a push-cable compartment feature 822 which may retain video push-cable elements. The video push-cable elements of jetter video push-cable embodiment may include a conductor and a structural layer. For instance, the video push-cable elements of jetter video push-cable embodiment 810 may include a conductor 830 disposed inside a structural layer 840. The conductor 830 may be copper or a copper alloy, copper clad steel, silver or a silver alloy, or other electrically conductive material. The structural layer 840 may be fiberglass or polypropylene or other dielectric material having a favorable elastic modulus. In yet further embodiments, the video push-cable elements retained inside a push-cable compartment feature such as the push-cable compartment feature 822 may be any video push-cable embodiment disclosed herein. The jetter video push-cable 810 may further include a hollow cavity 850 inside the hose 820 allowing the conveyance of water from a water source to flow through the jetter video push-cable embodiment 810 to a jetter camera head, such as the jetter camera head 1020 of FIGS. 10A and 10B and jetter attachment apparatus and camera head 1120 of FIGS. 11A and 11B. The hose 820 and video push-cable elements of the jetter video push-cable embodiment 810 may be disposed inside an electromagnetic shielding layer 870 which may further be disposed inside a jacket 880. The shielding layer 870 may be of an electromagnetically conductive material or alloy such as copper braid or other conductive materials. The jacket 880 may be polypropylene or like durable materials to protect the internal layers from the external environment.

Figure 9A:
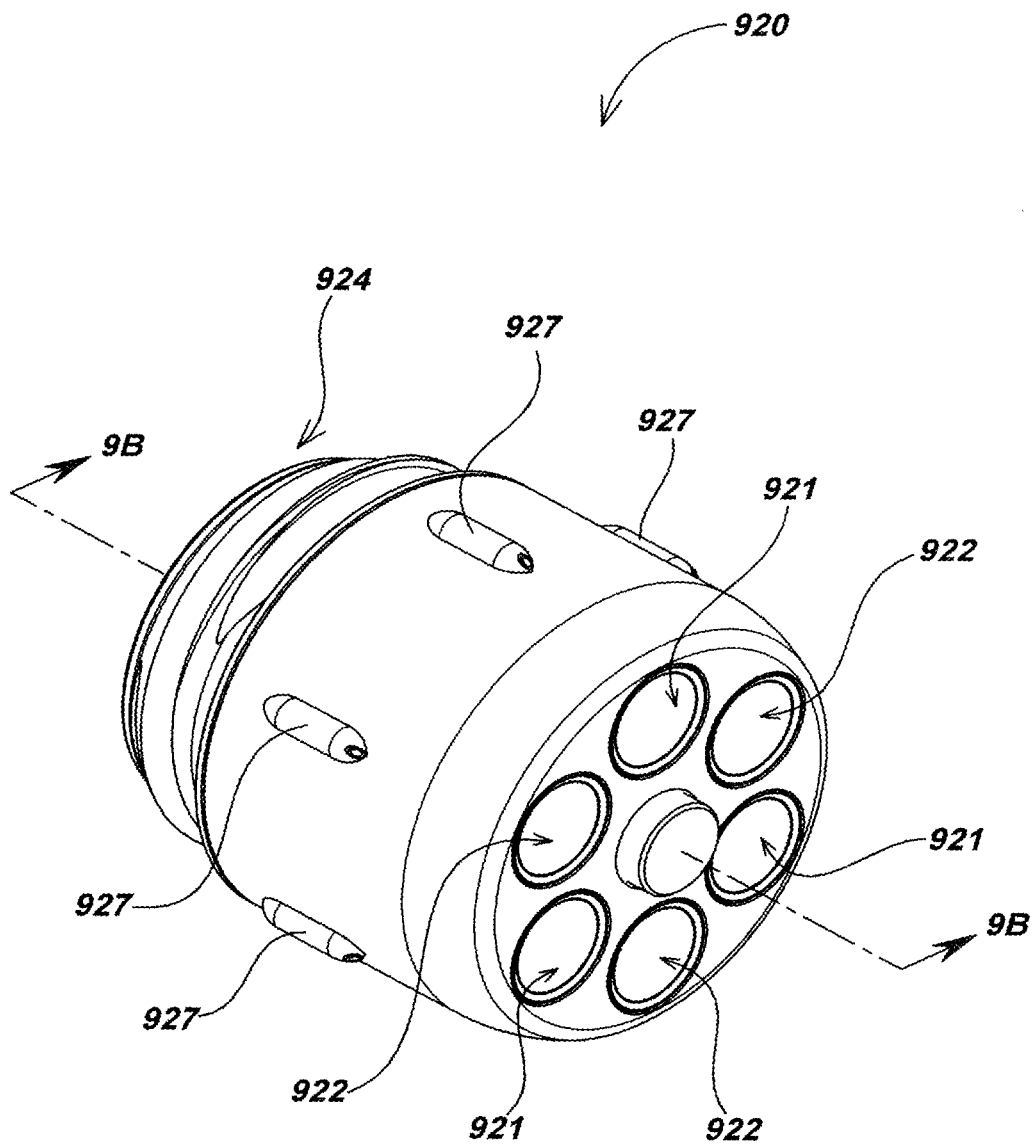
FIG. 9A is an isometric view of a jetter camera head.
Figure 9B:
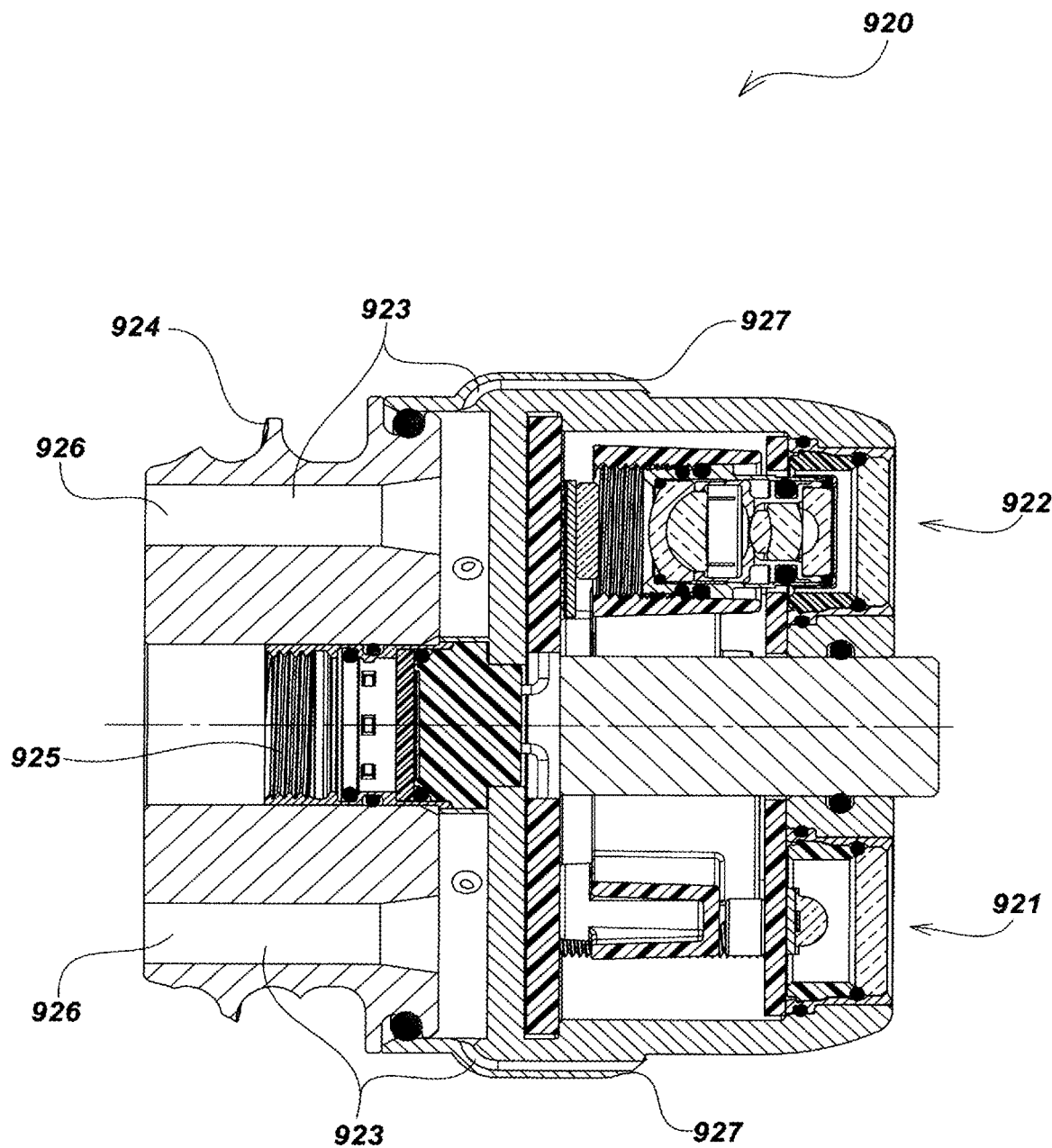
FIG. 9B is a cross-section view of the jetter camera head from FIG. 9A, taken along line 9B-9B.

Turning to FIGS. 9A and 9B, a jetter camera head 920 that may couple to push-cable 610 of FIGS. 6A and 6B. In other jetter camera head 920 embodiments, the jetter video push-cable 610 (FIGS. 6A and 6B) may be substituted with the jetter video push-cable 710 (FIGS. 7A and 7B), the jetter video push-cable 810 (FIGS. 8A and 8B), or other like the jetter video push-cables. Jetter camera head 920 may include one or more lighting elements 921 and cameras 922 to illuminate and generate video or other images from inside pipes or other conduits. Such signals may further be communicated back to one or more devices (e.g., CCU 440 of FIG. 4A) directly or indirectly coupled at the proximal end of a push-cable 610 (FIGS. 6A and 6B). The jetter camera head 920 may include one or more passages 923 (illustrated in FIG. 9B) allowing the flow of water to pass through jetter camera head 920. The passage 923 may be watertight in preventing the ingress of water into the portion of the jetter camera head 920 containing the cameras 922, lighting elements 921, and other associated electronics therein. A termination port 924 (FIG. 9B) may allow a jetter video push-cable 610 of FIGS. 6A and 6B to be connected establishing a separate electrical connection 925 and hose connection 926 for the provisioning of power and communication of signals and conveyance of water from push-cable to the jetter camera head 920. The water may flow through the passage(s) 923 (FIG. 9B) of jetter camera head 920 to one or more nozzle elements 927 for controlling and directing the jet of water. In some embodiments, a jetter camera head may further include a water directing element allowing the water to be aimed inside the pipe or other conduit for removing obstruction therein.

Figure 10A:
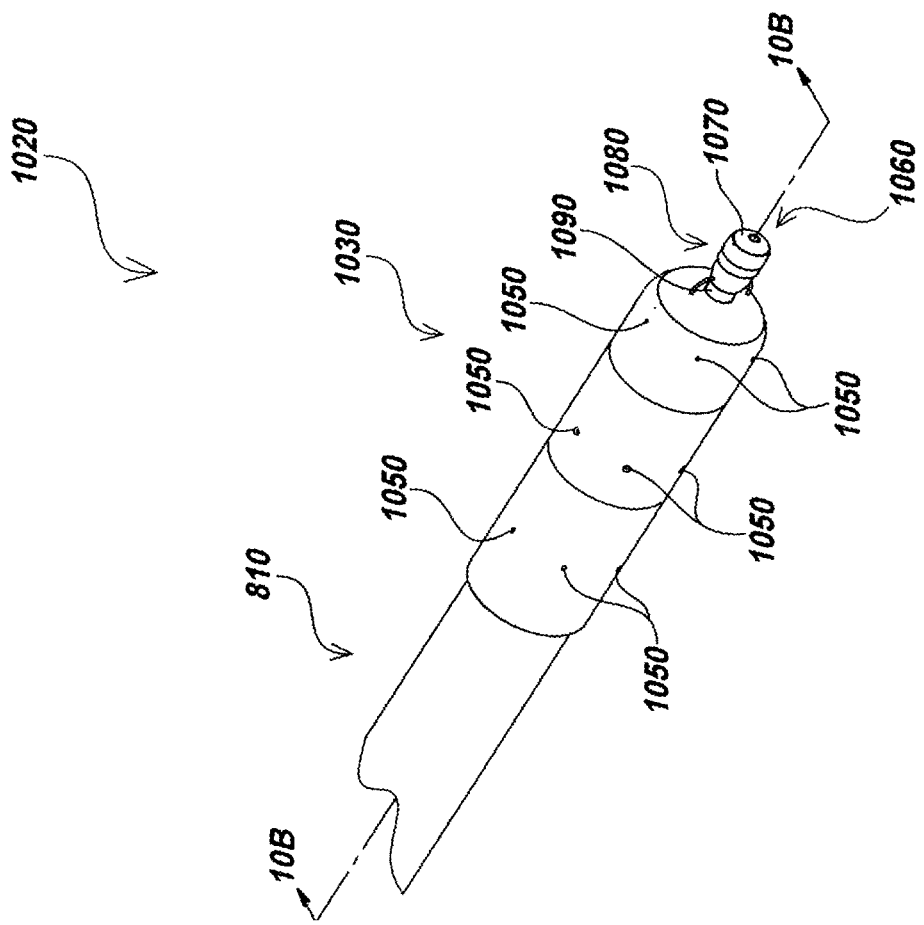
FIG. 10A is an isometric view of a jetter camera head.
Figure 10B:
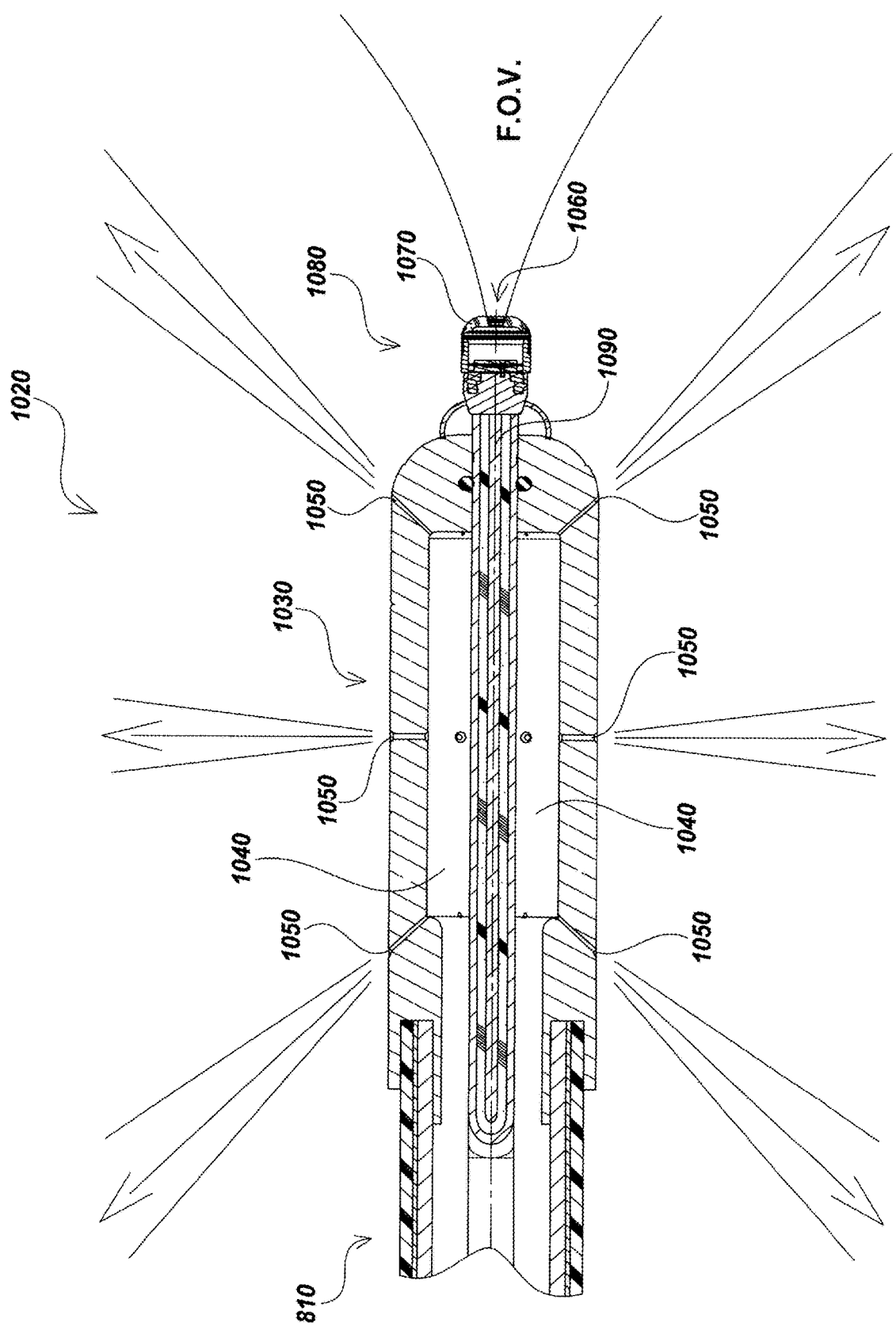
FIG. 10B is a cross-section view of the jetter camera head from FIG. 10A, taken along line 10B-10B

Turning to FIGS. 10A and 10B, a different jetter camera head embodiment 1020 is illustrated. The jetter camera head 1020 may secure to the jetter video push-cable 810 (FIGS. 8A and 8B). In other jetter camera head 1020 embodiments, the jetter video push-cable 810 (FIGS. 8A and 8B) may be substituted with the jetter video push-cable 610 (FIGS. 6A and 6B), the jetter video push-cable 710 (FIGS. 7A and 7B), or other like the jetter video push-cables. The jetter camera head 1020 may include a jetter housing 1030 having one or more passages 1040 (FIG. 10B) allowing for the conveyance of water to a series of nozzle elements 1050 for controlling and directing the jet of water. Signaling and power provision may be provided to one or more cameras 1060 and illumination elements 1070 disposed inside a camera housing 1080 positioned in front of the jetter housing 1030 by cable 1090.

Figure 11A:
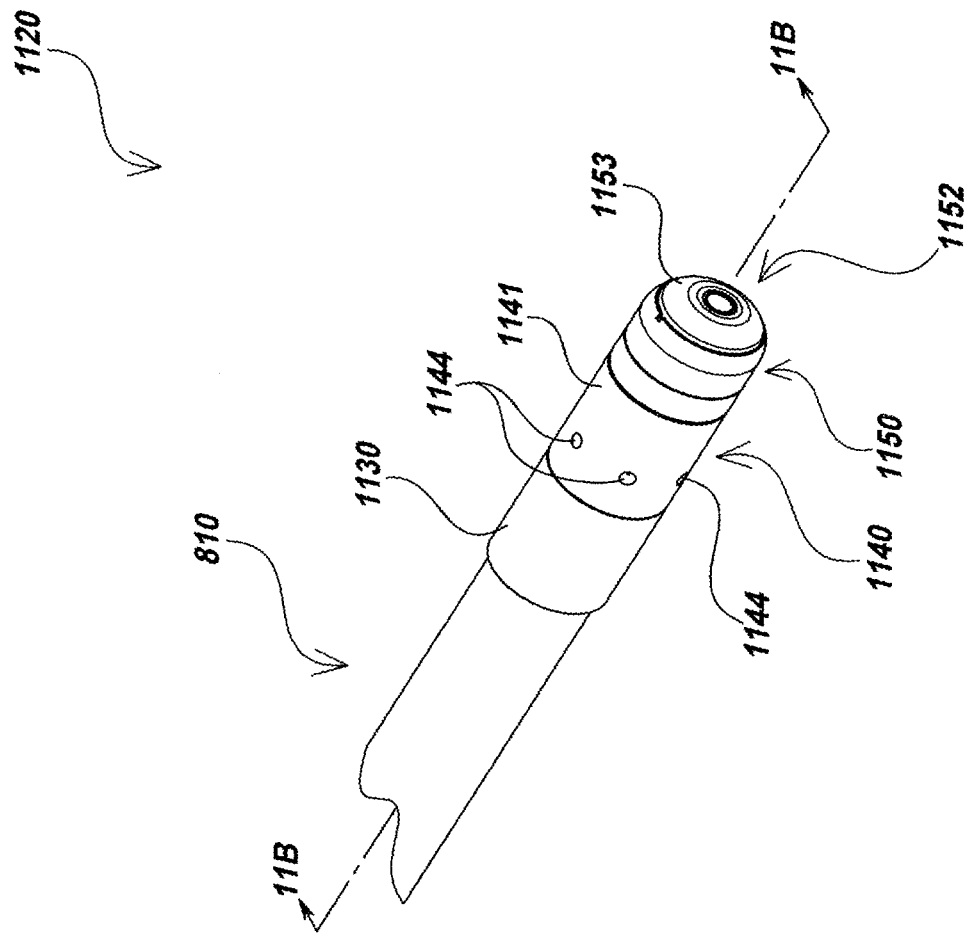
FIG. 11A is an isometric view of a jetter attachment apparatus and camera head embodiment.
Figure 11B:
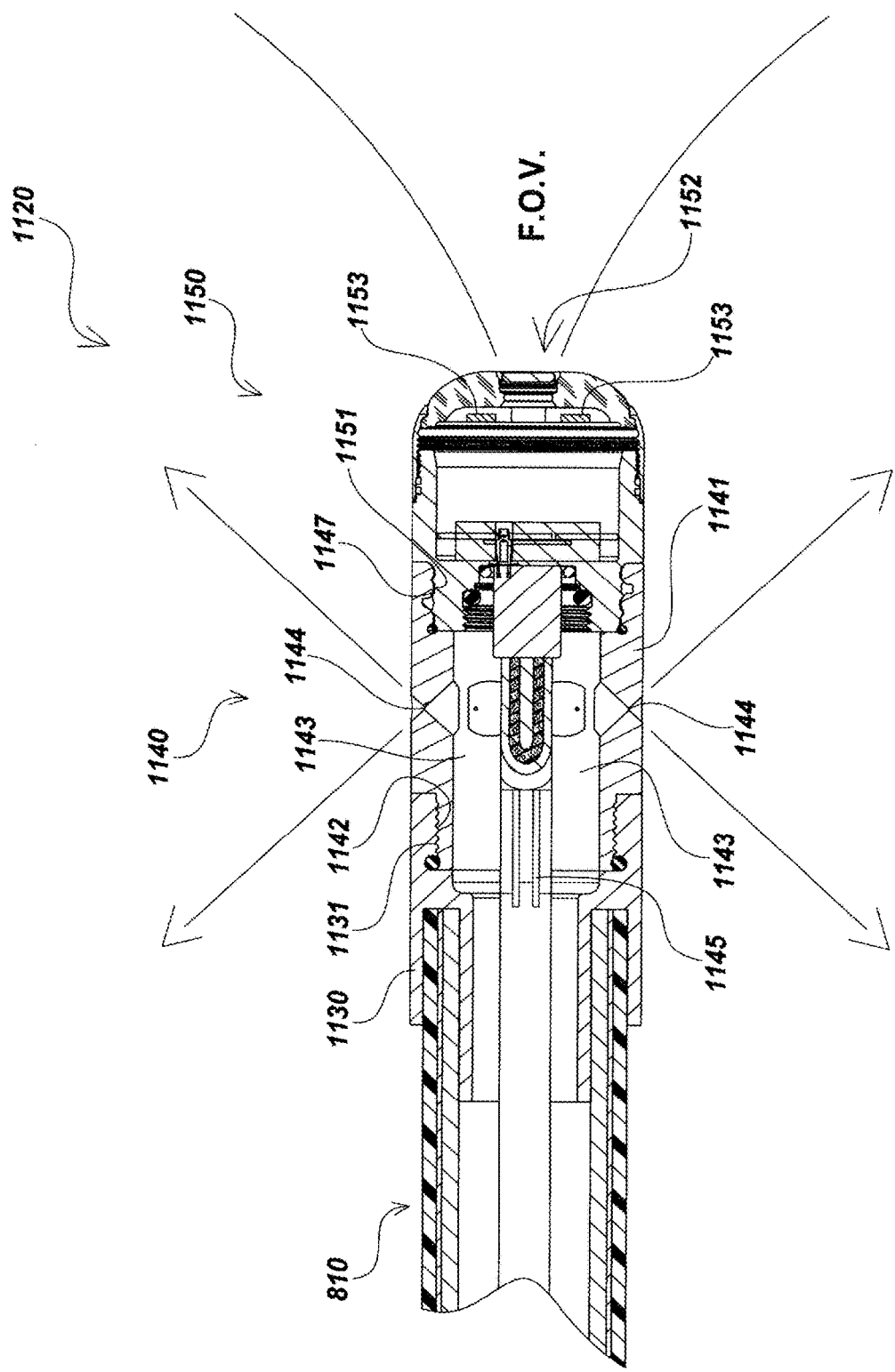
FIG. 11B is a cross-section view of the embodiment from FIG. 11, taken along line 11B-11B

In further jetter camera head embodiments, the camera head and jetting tool may be separate elements. As illustrated in FIGS. 11A and 11B a jetter video push-cable 810 which may further include a termination 1130 disposed about it's distal end may secure a jetter attachment apparatus and camera head embodiment 1120. The jetter attachment apparatus and camera head embodiment 1120 may include a jetter attachment apparatus 1140 and camera head 1150. The termination 1130 may allow for provisioning water to the jetter attachment apparatus 1140 and signal and power to the camera head 1150. For instance, the jetter attachment apparatus 1140 may have a jetter housing 1141 that may couple to termination 1130 via rear threads 1142 (FIG. 11B) on jetter housing 1141 mating with threads 1131 (FIG. 11B) formed on termination 1130. One or more internal passages 1143 (FIG. 11B) inside jetter attachment apparatus 1140 may allow for the conveyance of water from the jetter video push-cable 810 through termination 1130 and a connected jetter attachment apparatus 1140 to one or more nozzle elements 1144 on jetter attachment apparatus 1140. The nozzle elements 1144 may control and direct the jet of water for clearing away obstructions within a pipe or like conduit into which the jetter attachment apparatus and camera head embodiment 1120 may be placed. The jetter attachment apparatus 1140 may further include a wiring connector 1145 (FIG. 11B) which may communicating signal and power to a wiring termination 1146 (FIG. 11B) on the distal end of the jetter attachment apparatus 1140 which may further communicate signal and power to the camera head 1150 coupled thereto. The camera head 1150 may further couple to the jetter attachment apparatus 1140 via threads 1151 (FIG. 11B) formed on camera head 1150 mating with forward threads 1147 formed on the distal end of jetter attachment apparatus 1140. Signaling and power provision may be provided to one or more cameras 1152 and illumination elements 1153 disposed inside camera head 1150. The camera head 1150 may be or share aspects with U.S. Pat. No. 9,824,433, issued Nov. 21, 2017, entitled PIPE INSPECTION SYSTEM CAMERA HEADS and/or other camera heads as may be described in the incorporated patents and patent applications.

Systems including a jetter camera head embodiment and associated jetter video push-cables may include a water and wiring combining element. Such a water and wiring combining element may take the two separate inputs, pressurized water and wiring or like conductors for communicating the signal from a CCU or like camera control and video display device, and distribute and connect the separate inputs appropriately onto the video push-cable embodiments. In some system embodiments, the water and wiring combining element may be included in a drum reel, such as the drum reel 430 of FIG. 4A or the drum reel 1230 of FIGS. 12A and 12B.

Figure 12A:
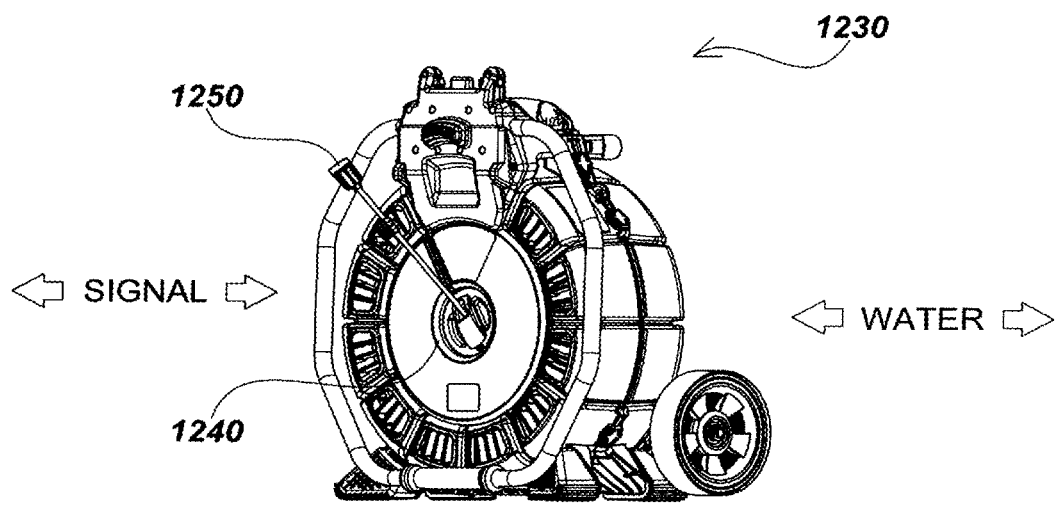
FIG. 12A is a drum reel embodiment having a water and wiring combing element.
Figure 12B:
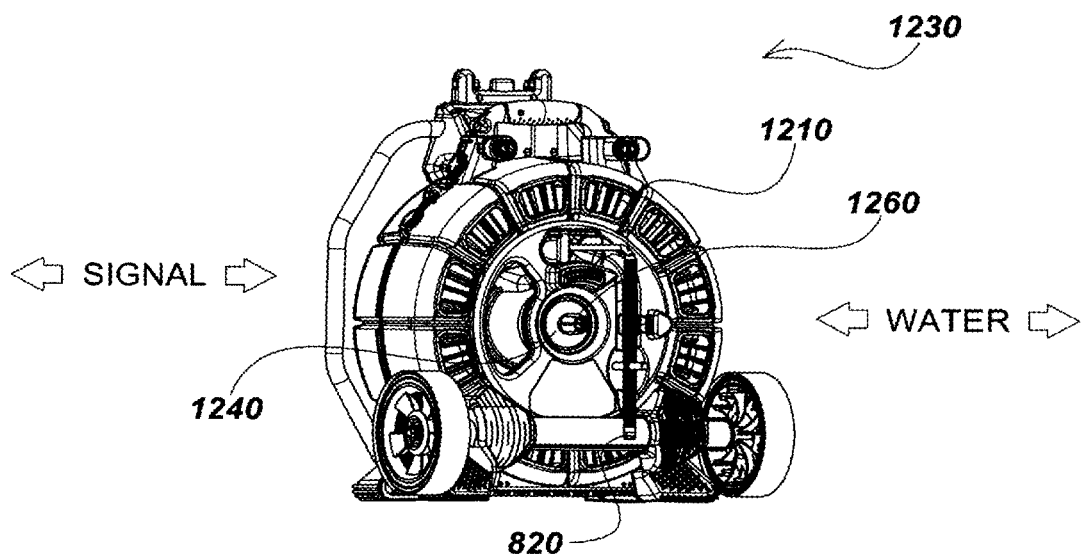
FIG. 12B is the drum reel embodiment from FIG. 12A viewed from the opposite side.

As illustrated in FIGS. 12A and 12B, the drum reel 1230 may store a jetter video push-cable 1210 (FIG. 12B) that includes a jetter camera head 1220 (FIG. 12B) coupled to the distal end of the jetter video push-cable 1210 (FIG. 12B). The jetter video push-cable 1210 (FIG. 12B) may correspond to the jetter video push-cable embodiment 510 of FIGS. 5A and 5B or jetter video push-cable embodiment 610 of FIGS. 6A and 6B. The jetter camera head 1220 (FIG. 12B) may correspond to the jetter camera head 420 of FIGS. 4B and 4C or jetter camera head 920 of FIGS. 9A and 9B. The drum reel 1230 may include a water and wiring combining element 1240. The water and wiring combining element 1240 of the drum reel 1230 may have a CCU connector 1250 (FIG. 12A) for connecting cabling associated with signal and or power communication with a CCU or like camera control and video display device on one face and a water connector 1260 (FIG. 12B) for connecting to a water source on the opposite face of the drum reel 1230. In other drum embodiments, connections for water and to a CCU or like camera control and video display device may exist elsewhere on the drum reel or push-cable.

Figure 13:
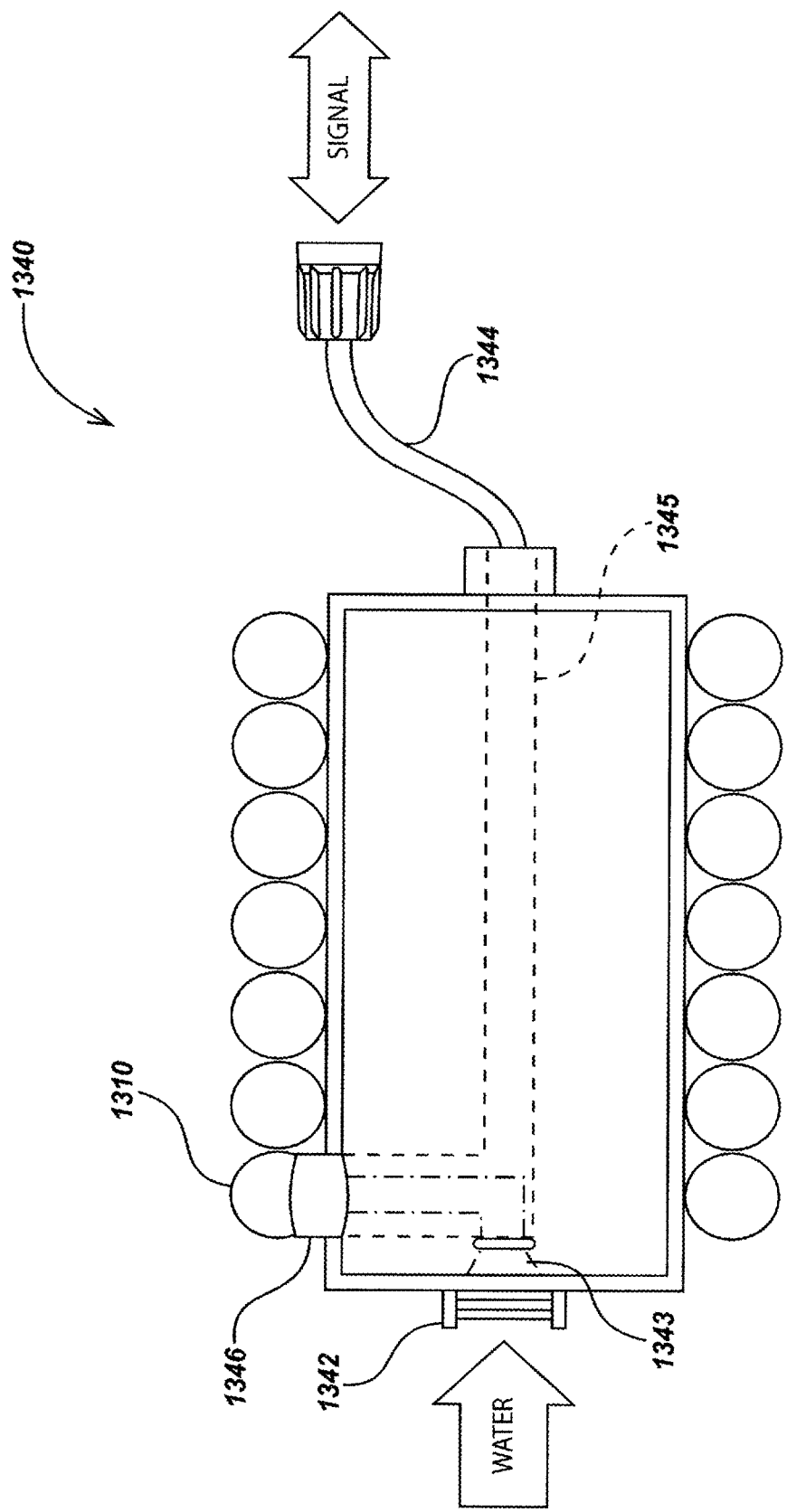
FIG. 13 is an exemplary water and wiring combing element embodiment.
Figure 14:
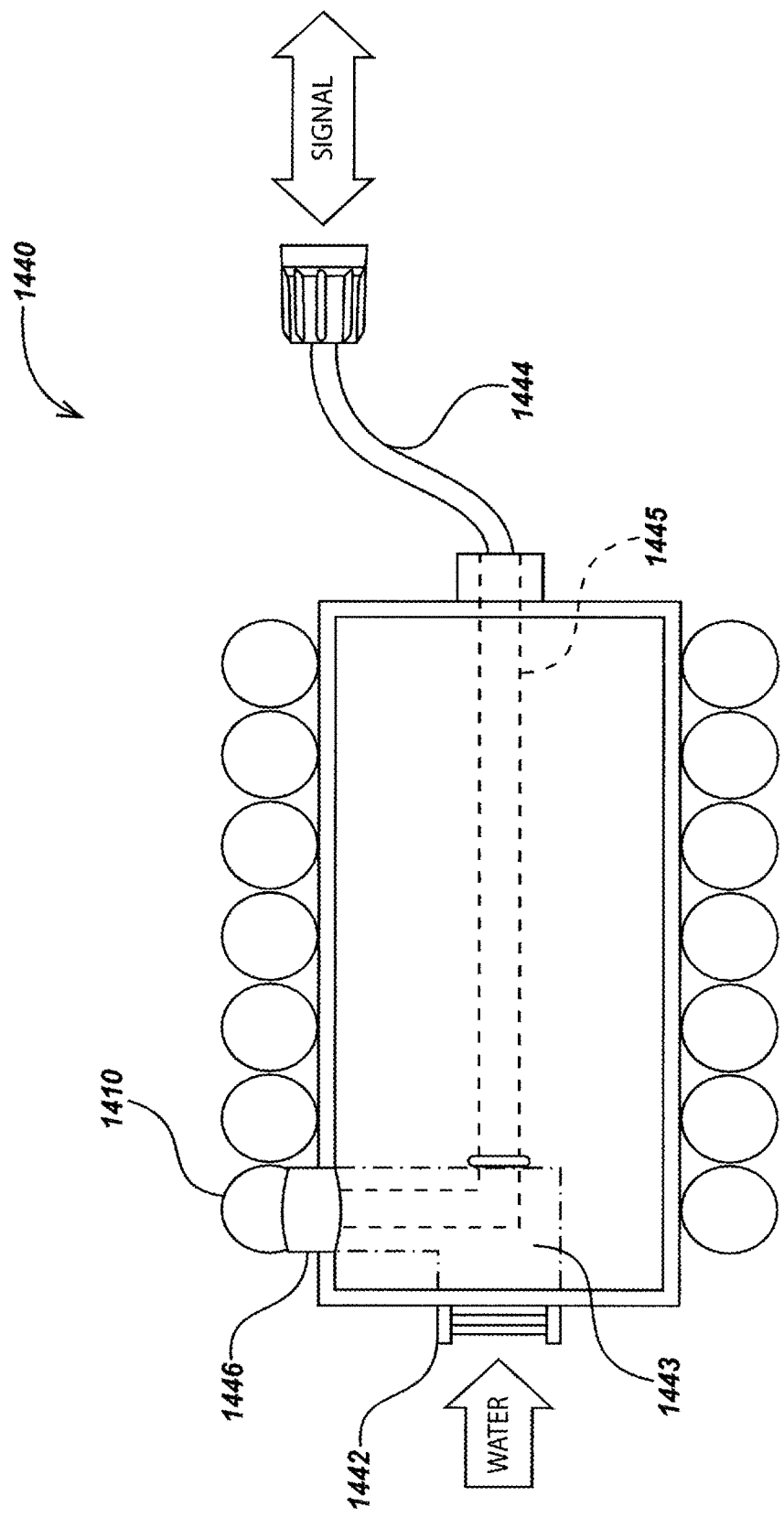
FIG. 14 is an exemplary water and wiring combing element embodiment.

Turning to FIG. 13, an exemplary water and wiring combining element 1340, which may correspond to the water and wiring combining element 1240 of FIGS. 12A and 12B, is illustrated having a water connector 1342 to connect the combining element 1340 to a water source. The water may enter the combining element 1340 at the water connector 1342 and flow through water cavity 1343. The combining element 1340 may also include a CCU connector 1344 for connecting the water and wiring combining element 1340 to a CCU or like camera control and video display device. The signal may be communicated through wiring or like conductive element (not illustrated) along wiring path 1345. The water cavity 1343 and wiring path 1345 may be sealed from one another upon intersecting and may distribute and connect the separate water and signal inputs appropriately onto the jetter video push-cable embodiment 1310 at cable coupling element 1346. As the water and wiring combining element 1340 of FIG. 13 is illustrated as having water cavity 1343 disposed inside wiring path 1345, the jetter video push-cable 1310 may correspond to the jetter video push-cable 510 of FIGS. 5A and 5B or like jetter video push-cable embodiments with a water conveying channel or other cavity disposed in the conductive or signal carrying element. Turning to FIG. 14, another exemplary water and wiring combining element 1440, which may correspond to the water and wiring combining element 1240 of FIGS. 12A and 12B, is illustrated having a water connector 1442 to connect the combining element 1440 to a water source. The water may enter the combining element 1440 at the water connector 1442 and flow through water cavity 1443. The combining element 1440 may also include a CCU connector 1444 for connecting the combining element 1440 to a CCU or like camera control and video display device. The signal may be communicated through wiring or like conductive element (not illustrated) in wiring path 1445. Upon intersecting, the water cavity 1443 and wiring path 1445 may be sealed from one another and distribute and connect the separate water and signal inputs appropriately onto the jetter video push-cable embodiment 1410 at cable coupling element 1446. As the water and wiring combining element 1440 of FIG. 14 is illustrated as having the wiring path 1445 disposed inside the water cavity 1443, the jetter video push-cable 1410 may correspond to the jetter video push-cable 610 of FIGS. 6A and 6B, jetter video push-cable 710 of FIGS. 7A and 7B, jetter video push-cable 810 of FIGS. 8A and 8B., or like jetter video push-cable embodiments with a conductive or signal carrying element disposed in the water conveying channel or other cavity.

Those of skill in the art would understand that information and signals, such as analog or video signals, data signals, audio signals, or other information signals may be represented and transmitted using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The scope of the presently claimed invention is not intended to be limited to the aspects shown and described previously herein, but should be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the invention. Thus, the presently claimed invention is not intended to be limited to the aspects shown herein but is to be accorded the widest scope consistent with the appended claims and their equivalents.

We claim:

1. A coaxial video push-cable, comprising:
   a central structural element of dielectric material selected to have a predefined elastic modulus;
   a conductor layer disposed about the central structural element;
   an impedance tuning layer disposed about the conductor layer, comprising a dielectric material having a thickness selected to provide a predefined electromagnetic impedance;
   a shielding layer disposed about the impedance tuning layer; and
   a jacket enclosing the shielding layer, impedance tuning layer, conductor layer, and central structural element.

2. The coaxial push-cable of claim 1, wherein the central structural element comprises fiberglass.

3. The coaxial push-cable of claim 1, wherein the conductor layer comprises copper braid.

4. The coaxial push-cable of claim 1, wherein the impedance tuning layer comprises polypropylene.

5. The coaxial push-cable of claim 1, wherein the shielding layer comprises copper braid.

6. The coaxial push-cable of claim 1, further comprising a friction modifier layer positioned between the shielding layer and jacket.

7. The coaxial push-cable of claim 1, wherein the friction modifier layer comprises a biaxially-oriented polyethylene terephthalate film.

8. The coaxial push-cable of claim 1, wherein the jacket comprises polypropylene.

9. A jetter video push-cable, comprising:
- a central hose having a channel to transmit and dispense pressurized water;
- a conductor layer disposed about the central hose;
- an impedance tuning layer disposed about the central hose having a thickness of a material selected to provide a predefined electromagnetic impedance; and
- a shielding layer disposed about impedance tuning layer.

10. The jetter video push-cable of claim 9, wherein the shielding layer comprises copper braid.

11. The jetter video push-cable of claim 9, further comprising a friction modifier layer between the shielding layer and jacket.

12. The jetter video push-cable of claim 9, wherein the friction modifier layer comprises biaxially-oriented polyethylene terephthalate film.

13. The jetter video push-cable of claim 9, wherein the jacket comprises polypropylene.

14. A jetter video push-cable, comprising:
- a hose adapted to dispense pressurized water;
- a video push-cable disposed in the hose; and
- a hollow cavity between the hose and video push-cable for the conveyance of water.

15. The jetter video push-cable of claim 14, wherein the video push-cable may comprise any of the multi-dielectric push-cable embodiments above.

16. The jetter video push-cable of claim 14, further including one or more positioning elements for positioning and holding the video push-cable at a desired position and orientation inside the hose.

\* \* \* \* \*